INVENTOR
DAVID S. GOLDSMITH
ATT'YS.

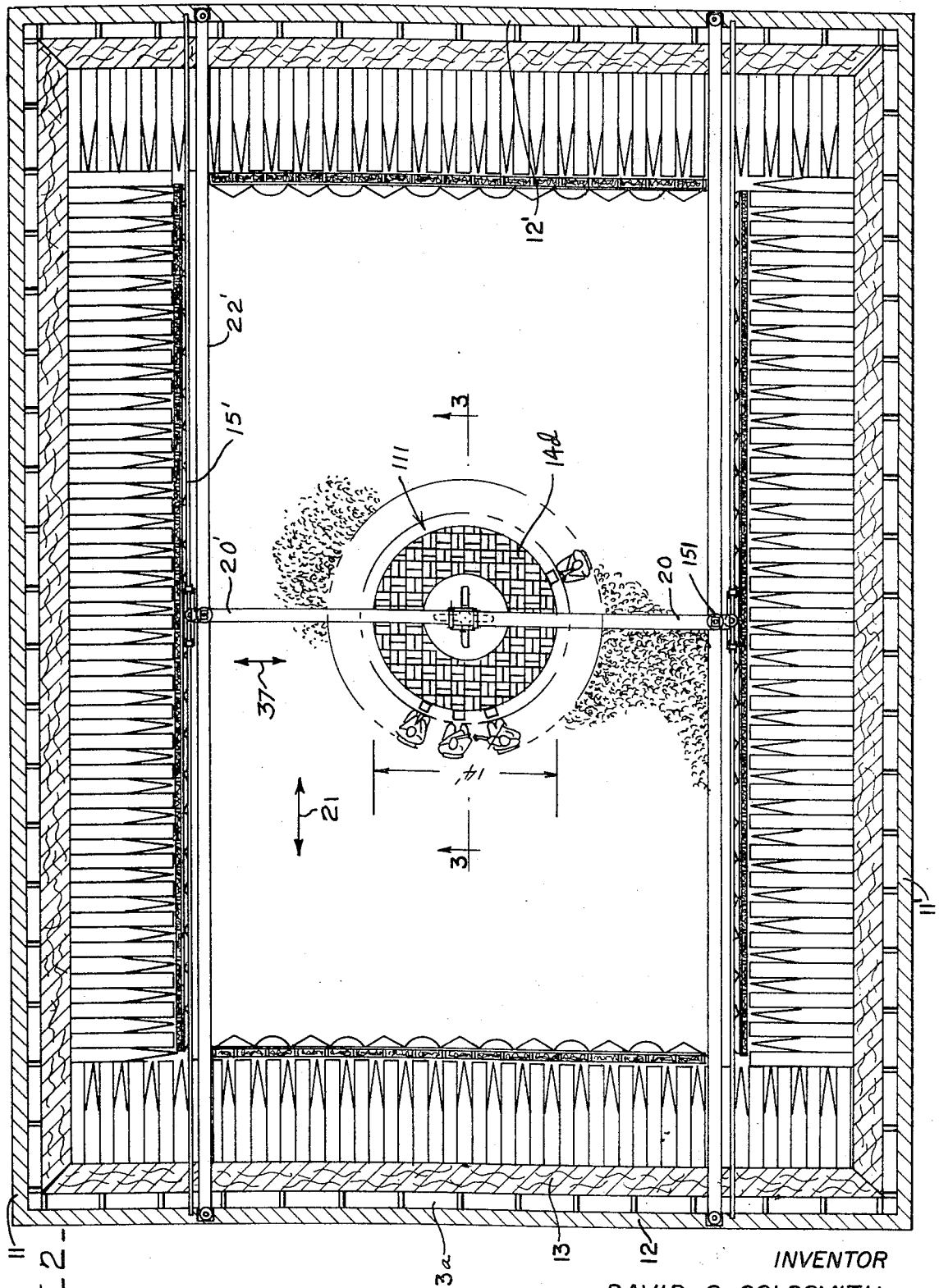

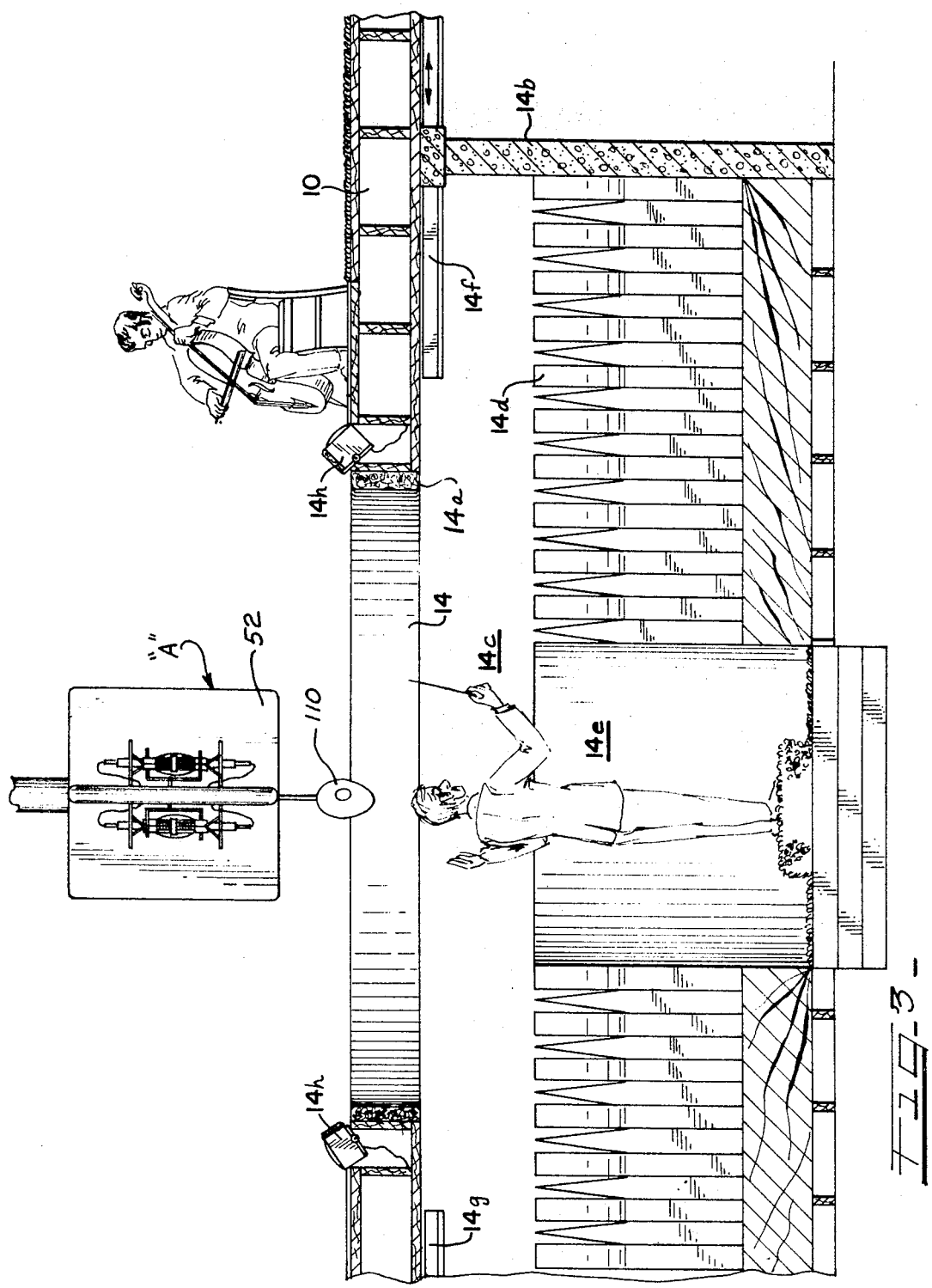

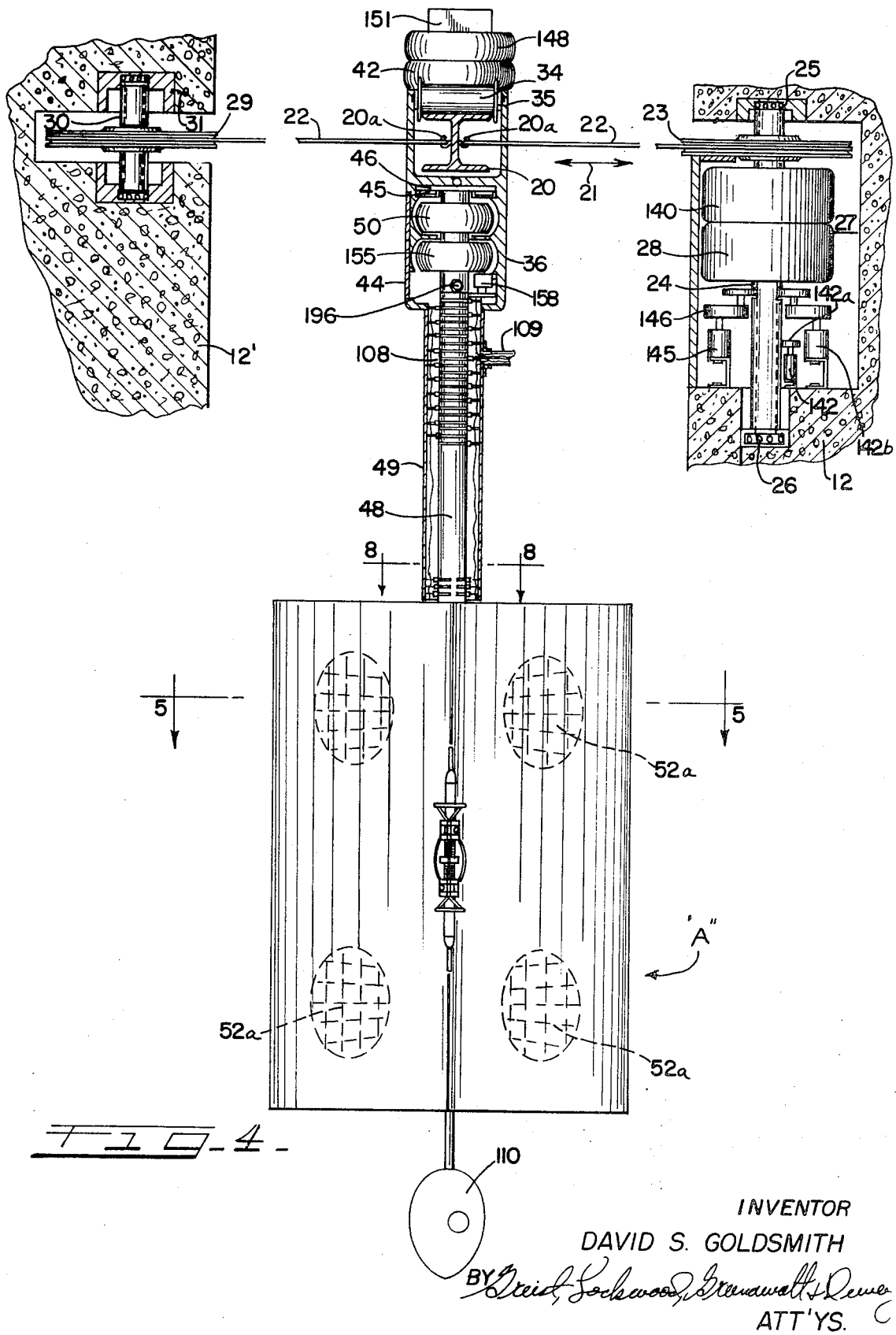

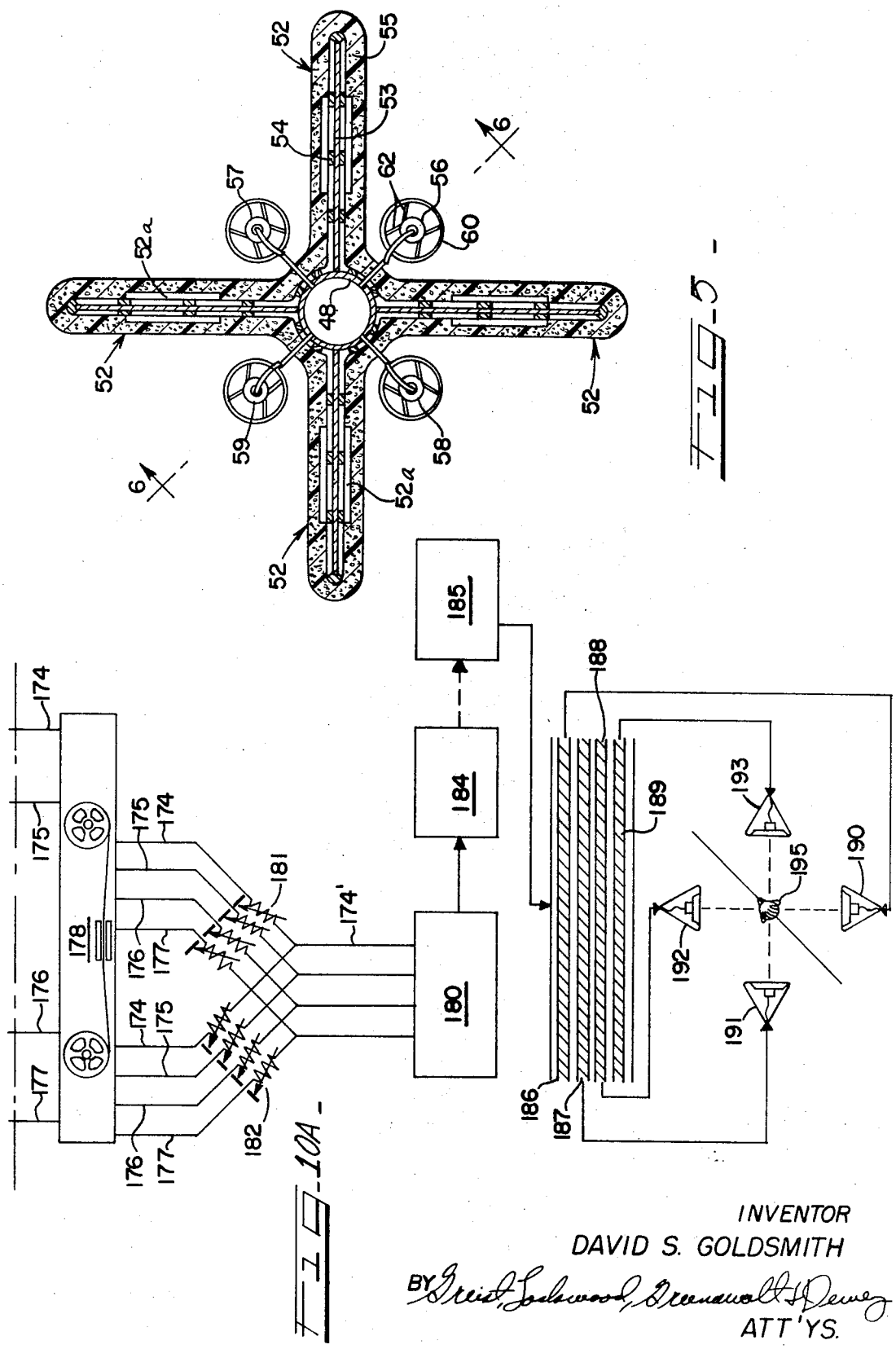

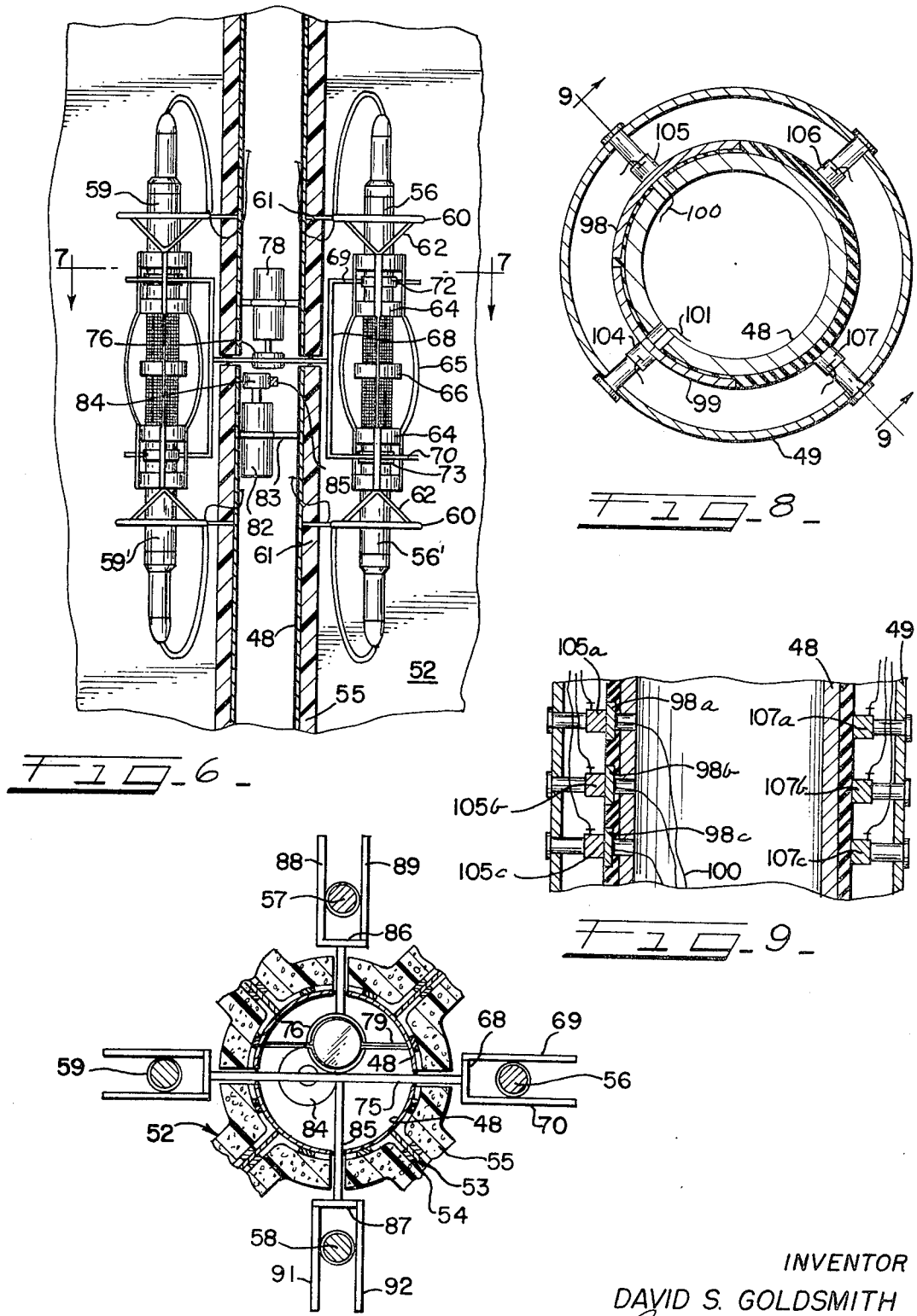

INVENTOR
DAVID S. GOLDSMITH
BY
ATT'YS.

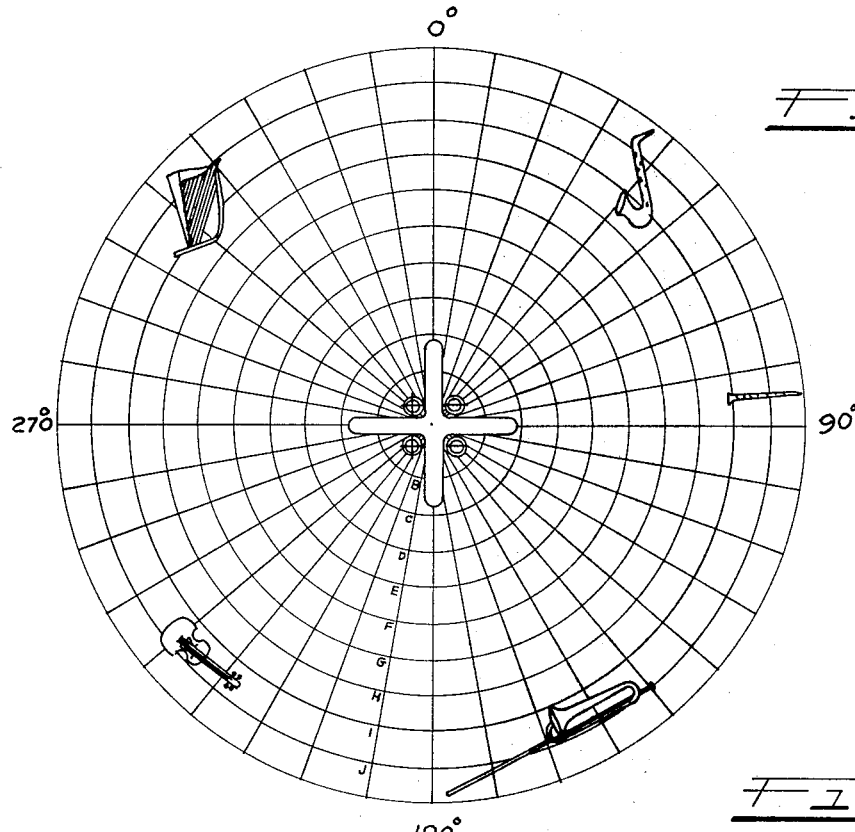
FIG-12
FIG-13
27 F  263°    263°-235°  1 REV./4 SEC.
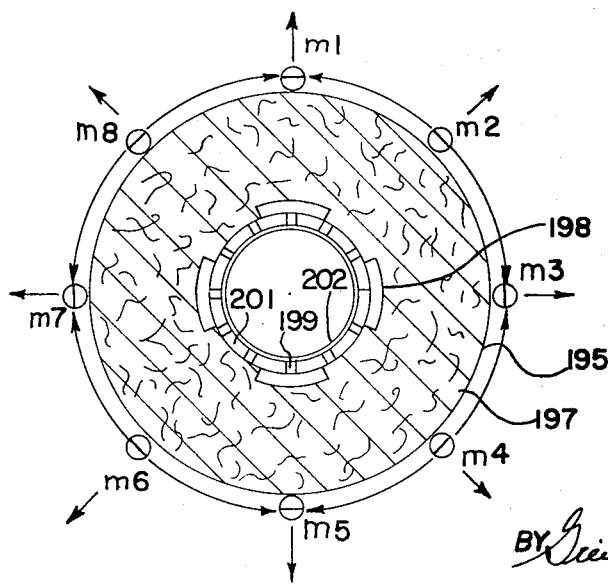
FIG-14
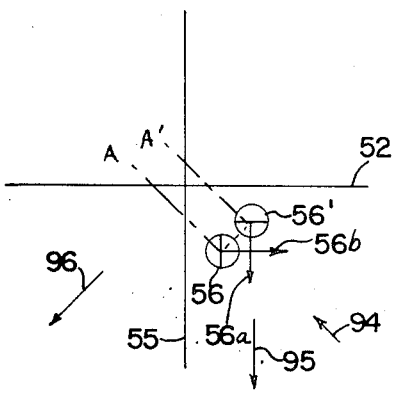
FIG-11
INVENTOR
DAVID S. GOLDSMITH
ATT'YS.

Dec. 12, 1972    D. S. GOLDSMITH    3,705,957
TRANSLATIONAL ROTATIONAL AND VERTICAL MOVEMENT
CONTROLLED SOUND SOURCE PICK-UP SYSTEM
Filed Feb. 19, 1970    9 Sheets-Sheet 9
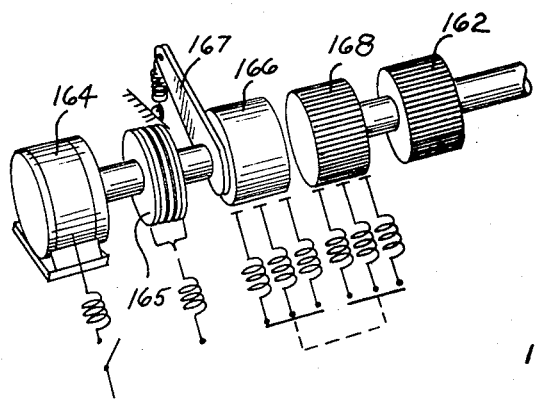
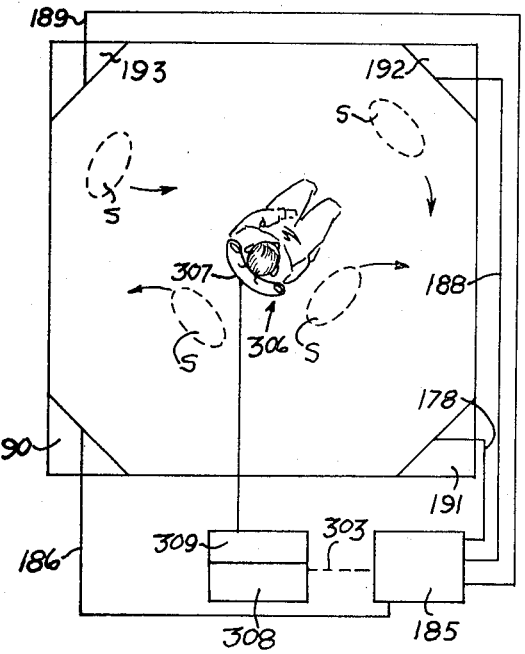
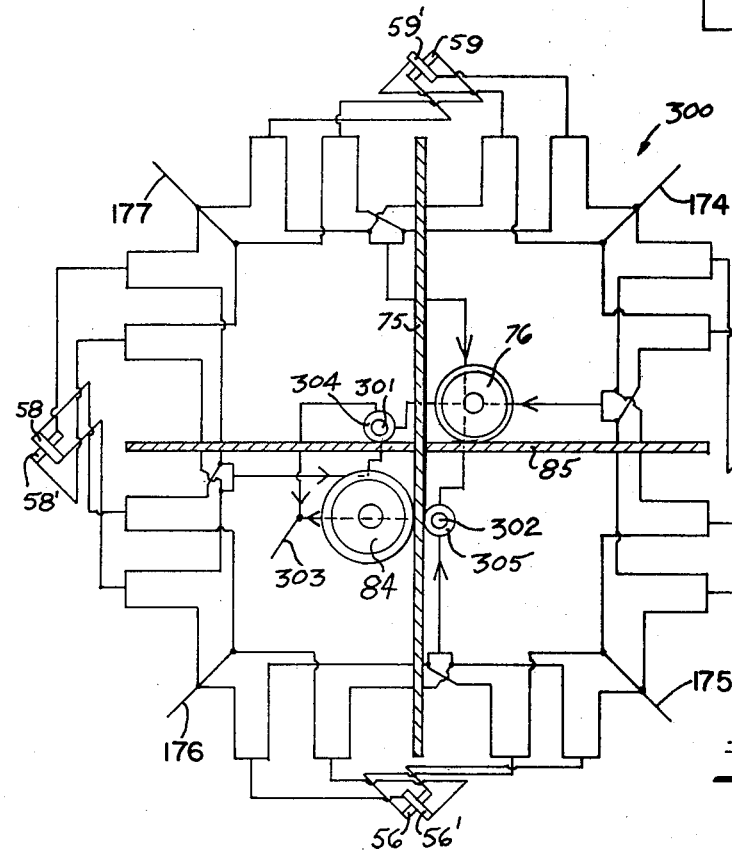
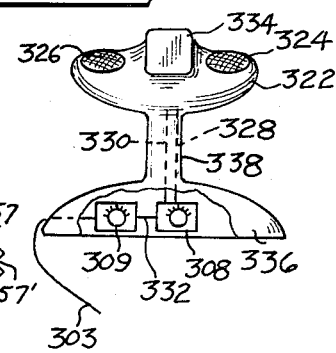
INVENTOR
DAVID S. GOLDSMITH
BY
ATT'YS.

United States Patent Office 3,705,957
Patented Dec. 12, 1972

3,705,957
TRANSLATIONAL, ROTATIONAL AND VERTICAL MOVEMENT CONTROLLED SOUND SOURCE PICK-UP SYSTEM
David S. Goldsmith, 8359 S. Crandon, Chicago, Ill. 60617
Filed Feb. 19, 1970, Ser. No. 12,814
Int. Cl. H04r 5/00
U.S. Cl. 179—1 G          45 Claims

ABSTRACT OF THE DISCLOSURE

A sound system for recording or broadcasting in which plural microphones are arranged for intensity sterophony or spaced microphone technique pickup of sound, and in which the microphones are mounted for controlled translational and rotational movement as a whole within a recording studio at a predetermined rate in relation to the tempo of a composition being played. Typically, musicians are positioned so as to totally surround the microphones, and microphone movement enables the eventual listener to be given the various novel musical impressions and effects caused by apparent movement of so-called virtual musical sources, including movement totally about the listener, whose selective hearing and auditory pursuit tracking capabilities are utilized. A suspended column carrying four pairs of microphones is mounted for such rotational and translational movement. Therefore, these three axes of movement may be made to correspond to the $x$, $y$, and displaced $z$-axes of a numerical control system which controls column movement within a specially constructed sound studio in which musicians are disposed in a ring-like formation. The microphones are of a highly directional response capability type able to pick up sound from the sectors of the ring of musicans toward which they are directed. These microphones are protected from incidence of sound from the slide by baffle vanes which prevent spatial distortion. Music thus picked up, upon reproduction, has an apparent or virtual source position determined by the location of the microphones during recording. In addition to rotation and translation as a group, the microphones may be declinated in vertically coincident pairs for altering their directional axes in response to the distance between them and the sound source. The composer marks the musical score with suitable symbols to indicate the desired disposition of virtual sources as the score is played. The numerical control system is programmed to impart to the microphone and baffle assembly the necessary movements for positioning the microphones during recording. Tone detectors, responsive to preselected tones in the music, are associated with the numerical control system for controlling the rate of information input to the control system reader, thereby controlling the rate or pace of movement of the movably mounted microphones. This serves as a pacing means such that the microphones will be moved in response to the time kept by the musicians during rendition of the musical composition.

BACKGROUND

The present invention relates to a method and apparatus for picking up of sound in auditory perspective that totally surrounds the listener and for accurate control of image steerage throughout this area, thereby permitting the production of novel musical effects in the listener's perception. The underlying principle of the invention is that life condition stereoacoustic information—through 360°, an indissociable component of hearing in life—should be viewed as indispensable in music; stereoacoustic information results in a heightening of sensory and affective responsiveness and may become an integral part of what might be regarded as peculiarly musical information. The invention is based on the use of the human stereocoustic faculty in conjunction with certain stereophonic and binaural pickup techniques to obtain the illusion for a listener that he is situated in an existential topologic relation to discrete exogenous musical sound sources which may surround him.

By so positioning the listener in a virtually existential situation, induced in him is at least a non-thetic prereflective self-consciousness, which suggests the finite, contingent and concrete nature or facticity of being in the world.

The novel musical effects brought about by the present invention are achieved by circumambient stereophony with the further provision of controlled motion between the virtual sources, this in turn being achieved by controlling an arrangement of plural microphones for picking up the sound sources in a circular or 360° area which upon reproduction creates for a listener the illusion that he is situated centrally with respect to the sound sources. More specifically, this circumambient stereophony or stereophonic encirclement in achieved by the use of a plurality of microphones which are mounted for pickup and possibly recording microphones defining a pickup sector or area, by transmitting or recording the pickup of these microphones simultaneously and with the sharing of adjacent microphone pickup areas by recoverable channels, whether on a recording medium or otherwise, the number of channels corresponding to the number of such shared microphone outputs.

Illusory relative motion is obtained, preferably in horizontal plane, between the sound sources and plural microphones which are mounted for pickup and possibly recording in auditory perspective. The term "auditory perspective" encompasses both binaural pickup or recording and two types of stereophony, viz. intensity stereophony and stereophony achieved by the time or spaced microphone technique. The embodiment based upon intensity stereophony, whether stereosony or mitte-seite technique employs plural microphone pairs separated by baffle vanes. The spaced microphone technique as herein embodied involves the use of plural microphones arranged in a horizontally disposed circular formation covering a 360° area, the use of baffle vanes not ordinarily being necessary in this embodiment.

Auditory perspective is achieved by stereoacousis which refers to the human faculty whereby the binaural system refers sound sources to their spatial locations without the mediation of reasoning. By auditory perspective pickup and recording are meant methods and techniques that provide stereoacoustic cues which the human binaural system may be said to interpret or "display" as sound source spatial locations. Encircling and motional controlled auditory perspective recording of the type referred to herein and provided by this invention is to be distinguished from conventional stereophonic pickup or recording which merely creates at either ear of the listener substantially the same stimulation he would perceive if in actual confrontation with sound sources which are only stationary and generally located only in front of him.

In one embodiment of the present invention, a numerical control system is provided for controlling translational as well as rotational movement of the microphones. A pacing system is also provided for controlling the rate of information input to the axes controlled as a function of real-time tempo of the unfolding musical rendition. This makes it possible not only to move the microphones about in any complex manner in the horizontal plane, for example, but also makes it possible to match separately picked up and synchronously reproduced prior or simultaneous performances, by permitting the present executants to hear the previous or simultaneous constituent performance, and this permits control of the relative positions of the separate sources while each is engaged in such independent complex motion. This is musically important for the relative positions of the sources are an important determinant of the musical texture perceived, which makes possible several novel musical techniques, including use of the apparatus as a musical instrument or in a manner analogous to the use of an instrument.

The novel effects in the listener's perception may involve the impression that he is himself undergoing rotary or translational impulsion. Translational motion of the listener can be used to simulate collision with the sound sources, but perhaps more importantly, can be used in relation to the exhilarating feeling obtained in rapid movement through space. These novel effects may also embrace factors of rhythm, meter, stressfulness of a tone, tempo and so forth. This may be even more important in a case of rotary motion, that is, giving the listener the impression that he is rotating about his own central axis—for this may give the listener the impression of himself as dancing. Translational motion might convey to the listener a feeling of dancing in a way in which he knows in reality he is physically incapable. The lack of kinesthetic, labyrinthine and other cues would of course present to the listener perhaps only a suggestion of dancing, but the relation of motor activity in space to factors in music could be quite powerful and thus a potential means of giving such musical factors a heretofore unavailable emphasis. For further background and for a more extensive discussion of the advantages and uses of the invention, reference may be had to the summary thereof further set forth herein.

SUMMARY OF THE INVENTION

The invention may be summarized as relating to a method and apparatus for picking up sound in auditory perspective by encircling or circumambient stereophony wherein the illusion obtains that the sound sources are moving independently about the listener in relation to score time elapsed under the requisite replicable control preferred for maximum utility for serious musical composition or performance.

OBJECTS OF THE INVENTION

A primary object of the present invention is the provision of an apparatus and method for sound pickup, such as musical recording in auditory perspective to produce novel musical effects in the listener's perception.

Another object of the invention is the provision of a microphone assembly for recording or picking up sounds for recording in circumambient stereophony.

Another object of the present invention is the provision of a new method and apparatus for recording in auditory perspective by causing relative movement between sound sources and plural microphones arranged in desired dispositions and whose positions during recording correspond in illusion to the position of sound sources heard by an eventual listener.

Still another object of the present invention is the provision of the method and apparatus according to the foregoing object wherein such movement is brought about by the use of an automatic, reproducible positive positional and temporal control system.

Another object of the invention is the provision of a new method and apparatus according to the foregoing object wherein pacing means are provided for controlling the rate of information input to such numerical control or like positive control system as a function of tempo or time of the composition as played, so that repeatable control of virtual source position at every point in the score is achieved.

Still another object of the present invention is the provision of a method and apparatus for recording in auditory perspective by the utilization of intensity stereophony which employs plural pairs of microphones arranged for covering a 360° area, and the use of recording means for recording simultaneously the pickup of all such microphones with the sharing of the pickup of adjacent microphone pairs by the recoverable channels of a recording medium.

Another object of the present invention is the provision of a new method and apparatus for recording in auditory perspective by a spaced microphone technique including plural microphones spaced apart from each other and radially spaced apart from a common point lying centrally of the 360° pickup area.

Still another object of the present invention is the provision of a new apparatus for recording in auditory perspective, such apparatus including plural pairs of microphones, separated from one another by a unique baffle unit for the purpose of eliminating spatial distortion caused by pickup of sources that are lateral with respect to said pairs of microphones.

Another object of the invention is the provision of an apparatus having the foregoing object among others, wherein the microphones are of a highly directional capability type and each is mounted for rotation or declination thereby to alter its directional axis in response to relative movement between the sound source and the microphones.

Still another object of the present invention is the provision of an apparatus according to the foregoing object wherein such altering declination of the microphones occurs relative to the placement of the support means for the microphones and in response to the movement of associated position transducers located on a portion of the support means.

Yet another object of the present invention is the provision of a new apparatus for recording in auditory perspective, such apparatus being operatively associated with a numerical control mechanism for permitting preselected complex movements of a plural microphone unit or units and for permitting synchrony among constituent recordings or simultaneous pickups from plural actual sound sources to produce final recording or broadcasting capable of producing novel musical effects in a listener's perception on account of the virtual sources being made to assume pre-arranged relative positions.

Another object of the present invention is the provision of an apparatus according to the foregoing object in combination with plural speakers equally spaced from each other and from a common listening station.

Still another object of the present invention is the provision of a method and apparatus of the type described wherein the disposition of the microphones is such that a virtual source may "walk" from one stereo segment or area into an immediately adjacent stereo segment or area, thus making possible the illusion that such source completely encircles a room in which the listener is situated when such stereo areas are arranged in a continuous pattern.

Yet another object of the present invention is the provision of a method and apparatus according to the foregoing object which further provides for the illusion of the sound source "walking" or moving about the listener between the listener and the outermost speakers.

These and other objects and advantages of the invention will become apparent from the following specification disclosing various preferred embodiments of certain components, assemblies and methods of the invention shown in the accompanying drawings.

DESCRIPTION OF THE DRAWINGS

FIG. 2 is a top plan view of the studio of FIG. 1;

FIG. 3 is an enlarged vertical sectional view of the studio of FIG. 2 taken along line 3—3 thereof;

FIG. 4 is an enlarged view, partly in section and partly in elevation taken generally along the line 4—4 of FIG. 1;

FIG. 5 is an enlarged section taken along the line 5—5 of FIG. 4;

FIG. 6 is a section taken along the line 6—6 of FIG. 5;

FIG. 7 is an enlarged section taken along the line 7—7 of FIG. 6;

FIG. 8 is an enlarged section taken along the line 8—8 of FIG. 4;

FIG. 9 is a section taken along the line 9—9 of FIG. 8;

FIG. 10A is a diagrammatic view forming a continuation of FIG. 10;

FIG. 11 is a diagrammatic view illustrating the principle of microphone declination;

FIG. 12 is a plan view of a sheet of graph paper the composed may use to indicate the position of the microphones relative to the sound sources;

FIG. 13 is a view of a musical staff showing the manner in which the composed would mark the same;

FIG. 14 is a horizontal section taken through a modified microphone mounting arrangement;

FIG. 15 is a partially diagrammatic view of a part of the pacing system of the invention;

FIG. 16 is a diagrammatic view of a system used for controlling the volume of a fifth audio channel used in one form of the invention;

FIG. 17 is a somewhat diagrammatic plan view showing the production of virtual musical sound sources produced in the region of a listener; and FIG. 18 is an elevational view of an auxiliary speaker unit having time delay and volume controls and useful to produce the effects shown in FIG. 17.

DESCRIPTION OF THE PREFERRED EMBODIMENTS OF THE INVENTION

The sound studio

Figure 1:
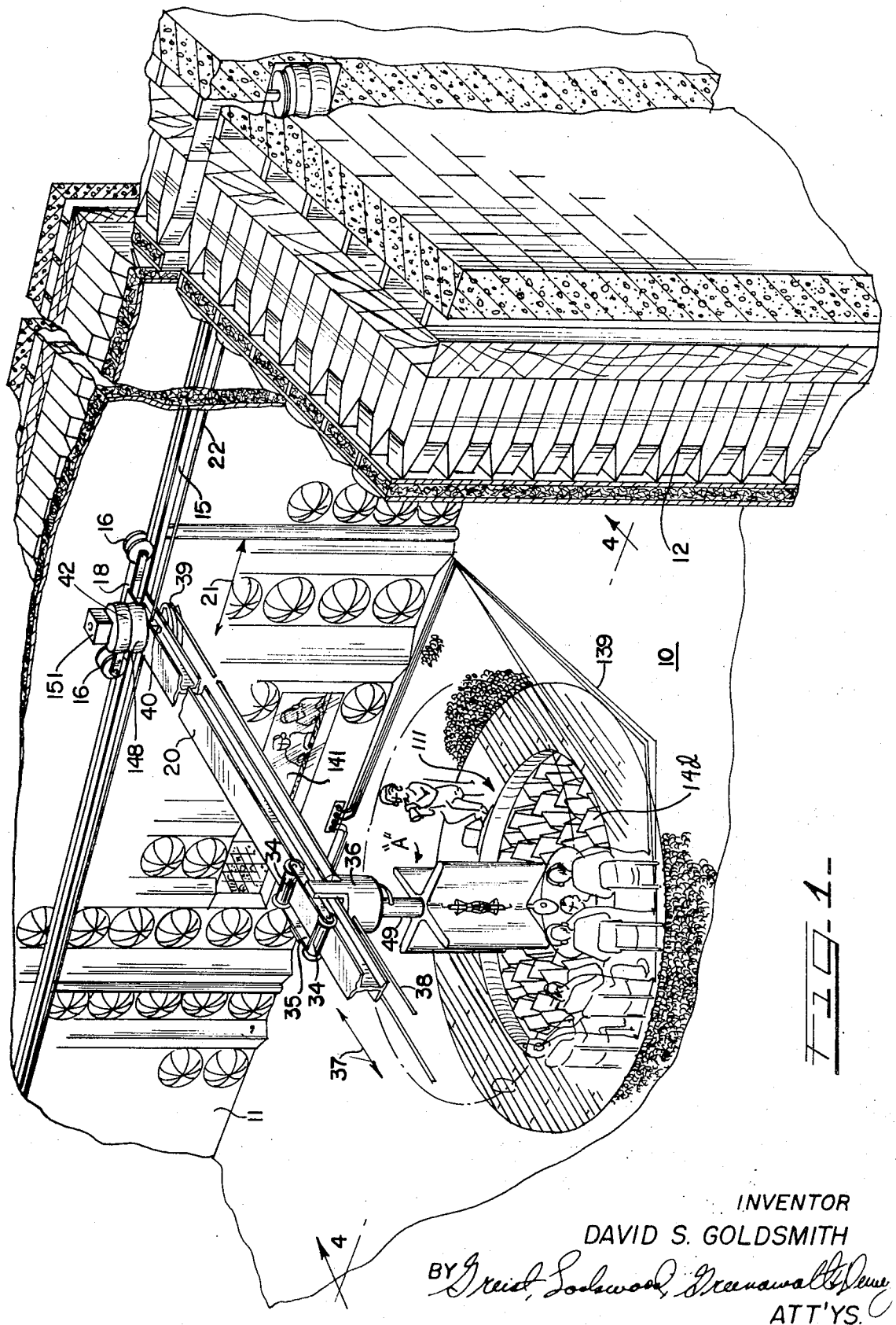
FIG. 1 is a fragmentary perspective view of a specially designed recording studio showing the installation of a preferred embodiment of a sound system made according to the present invention.

The present invention may be advantageously practiced in a special recording studio of the type shown in FIGS. 1–3. The studio is of a rectangular configuration and includes a floor 10, side walls 11, 11' and end walls 12, 12'. It has been mathematically determined that the studio will have a height of 24 feet, a width of 38 feet, 4 inches and a length of 60 feet, defining a volume of about 55,000 cubic feet. The studio walls are lined with supporting structure 13 defining a plurality of air cavities 13a serving as a sound absorptive means. The structure 13 mounts anechoic wedges 14d which, when fully exposed serve to deaden the studio in conjunction with sound absorbent throughout the studio on its reflective surfaces. The detachable or slidable inner walls (not shown) are provided for permitting a means whereby the reverberation time can be gradually raised to approximately 0.9 second at 1 kHz. The ceiling (not shown) of the studio is constructed in the same manner as the walls 11, 11', 12, 12' of the building as just described.

Reduction of reverberation is desirable in proportion to the number of constituent recordings entering into the final recording inasmuch as reverberation is added each time a constituent recording is added to conjointly constitute the final composite recording. The movable or slidable walls 11 (FIG. 11) should be substantially non-resonant, and may be somewhat angled to inhibit the production of standing waveforms. These walls 11 may be completely detachable for ready removal and installation, but are preferably slidably mounted for being slid in front of the anechoic wedges 14d for alternately exposing or covering the latter in a continuously variable manner. Such movement may be imparted to the walls as a management or auxiliary function of a control system associated with the walls 11.

In order to provide a space for a prompter or conductor visible to the players all around, while at the same time eliminating floor reflection and providing a resonant floor means for obtaining sub-harmonics of the floor-peg instruments, an opening or port 14 (FIG. 3) is provided in the floor 10 under the area of movement of the microphone and baffle assembly. This opening is preferably lined with sound absorbent materials 14a. An annular wall 14b preferably intermittent or interrupted, is disposed beneath the floor 10; this wall defines a space or chamber 14c. Mounted within this chamber is an annular pattern of upstanding anechoic wedges 14d which define well 14e for the prompter or conductor. These wedges absorb floor directed sound waves and may furthermore, when open prevent "hangover" and when closed, prevent honking of the lower chamber at its eigenfrequency where the aforementioned annular wall is continuous. The opening 14 may be obturated by hemispherical, slidable under-slung floor panels 14f, 14g which, if motor driven, may be controlled as a management or auxiliary function of the numerical control system to be described later. If, upon closing, the hemispherical panels 14f, 14g, are not brought together so as to seal off the port 41 hermetically, but rather only to be disposed closely adjacent each other, the well 14e, if otherwise air tight, may be used to obtain bass reflex or bass inversion reinforcement. In the event the panels 14f, 14g are closed obturating the opening 14, as when for example several baffles are simultaneously being used for broadcasting, in which case the prompter or conductor will not, of course, be situated in the well 14e, closed circuit television monitors 14h may be provided as means for allowing the players or musicians to see and follow a prompter who will then be remotely located in relation to the musicians. Such monitors may also be used to display sheet music to the players, whether or not such music is displayed by teleprompters or the like, the variable control of which forms a part of the numerically controlled baffle movement system.

It is desirable that the floor 10 of the studio be covered with thick pile carpeting. The studio has attenuating sound-locked outer doors and a ventilation system (not shown) incorporating plenum silencers and ventilating wedges. In an embodiment incorporating ultra high fidelity condenser microphones, as is preferred, the diameter of the opening 14 is preferably of the order of 14 feet. The side wall 11 contains a standard double glass monitor room window 14l permitting viewing of the studio interior by attendants of the recording and numerical control consoles. Generally, the studio will be constructed according to the best practices of architectural acoustics.

The microphone and baffle supporting means

According to the illustrative embodiment of the present invention, plural microphones associated with special baffle vanes are mounted in the studio for movement relative to the sound sources, i.e., stationary musicians. To this end, a horizontally disposed rail 15 (FIG. 1) is suitable mounted along the side wall 11 at a distance of approximately eleven feet from the floor 10. This rail supports and guides a pair of rollers 16 rotatably mounted at either end 18 of a microphone supporting structure in the form of a cross beam 20, which may be of the I-beam or wide-flange type. The rollers 16 mount the cross beam 20 to permit beam 20 to move axially of the rails 15, perpendicular thereto.

At this time it should be mentioned that the opposite side wall 11' includes supporting structure (not shown) similar to the rails 15 and rollers 16 for traversably supporting the other end of the beam 20. The cross-beam 20 is therefore mounted for movement in either direction transversely of the studio as indicated by the directional arrows 21. This movement is imparted to the cross-beam 20 by a continuous cable 22 having end portions thereof connected to the web of the beam 20 by connectors 20a supported from the web.

Referring now particularly to FIG. 4, the cable 22, which is preferably of a quasi-gear type having periodically spaced lobular formations, is shown to be trained around a drive pulley 23 mounted on a drive shaft 24, the latter having upper and lower ends thereof journaled in bearings 25, 26. These journals are supported in recesses within the cavity 27 forming a part of the interior of the end wall 12. The drive shaft 24 extends through and is driven by an electric or electro-hydraulic motor 28 which, if the former may be a through-bore pancake configuration torquer made by the Inland Motor Corporation of Radford, Va., for example.

The run of the cable 22 not anchored in the web of the cross beam 20 passes through an appropriate opening (not shown) in the web. As noted in FIG. 4, the end of the cable 22 opposite the end trained over pulley 23 is trained around an idler pulley 29, which is rotatably mounted on a shaft 30, the latter being suitably supported within the other end wall 12'. This wall 12' also includes an appropriate cavity 31 for receiving the idler pulley 29.

It should be apparent that energization of the torque motor or torquer 28, which is of the reversible type, will result in movement of the beam 20 in either direction as indicated by the arrows 21. It will be understood that identical drive means are provided at the end of the crossbeam 20 opposite the end 18 adjacent rail 15, for conjointly moving the same.

Cross-beam 20 supports and guides a pair of rollers 34 which are rotatably mounted at opposite ends of a pair of bars 35 extending parallel to the beam 20 and defining a monorail-type trolley. This trolley mounts a rotary servo-components housing unit 36 for movement thereof in either direction along the beam 20 as indicated by the directional arrows 37. Such movement is imparted to the unit 36 by a continuous cable 38 having closely spaced apart ends on one run thereof connected to the unit 36, the other run of this cable 38 preferably along the exterior of the unit 36. The cable 38 is trained around a drive pulley 39 mounted on the lower end of a drive shaft 40, such drive shaft being suitably journaled in the beam 20 adjacent one end thereof. Rotational movement is imparted to this drive shaft, and consequently to the drive pulley 39, by a torque motor or torquer 42. It will be understood that the cable 38 is also trained over an idler pulley (not shown) disposed opposite pulley 39 and suitably supported by the other end of cross-beam 20. A counterweight to offset the weight of motors 42 and associated components may also be disposed at the opposite end of the beam 20.

The cables 22 and 38 will be maintained as taut as practical without placing undue stress on their supporting members. Suitable support means (not shown) may be provided for supporting these cables at spaced points along the lengths thereof. All of the roller bearings used in the motors, shafts, etc., will be of the noiseless type incorporating neoprene-sealed ball bearings, and sound-deadening material is provided between the outer surfaces of the rollers and the guide surfaces on the rails and beams, thereby to bring about essentially noiseless operation of the aforedescribed means which support the unit 36 for movement within the recording studio.

As noted in FIG. 4, in the unit 36 is hollow, access to the interior thereof being provided by a removable panel 44. The unit 36 includes suitable means supporting a plurality of horizontally disposed tapered roller bearings 45 in a radially arranged fashion. These bearings engage the underside of a disk 46 thereby supporting the same for rotation about the vertical central axis of a column 48, the upper end of which is attached to the disk 46. The column 48 extends through an opening in the lower end of the unit 36 and is contained our housed within a sleeve 49, the upper end of which is attached to the lower portion of the unit 36. Other bearing means (not shown) engage the column intermediate the ends thereof for firmly supporting the same. A motor or torquer 50 receives the column 48 and may rotate the same at any desired speed in either direction about its vertical central axis. It will be appreciated that the cross-beam 20 may be said to move along an x-axis defined by the rail 15, and that the unit 36 may move along a y-axis defined by the beam 20, with unit 36 being positionable any place within the plane defined by the beams 15, 20, and that its location will be a resultant of components represented by its displacement along each axis.

The baffle

Referring now in particular to FIG. 5, there is shown an intensity stereophony type microphone and baffle assembly "A" mounted on the lower end of the column 48 and including a baffle arrangement having four radially extending vanes 52 of identical construction. Each baffle vane 52 is constructed of a ⅜₆ inch thick steel reinforced framework 53 which is suitably connected to or integral with the column 48. This framework may have horizontally extending steel ribs spaced vertically apart from one another approximately six inches. One inch thick vertical wood battens 54 are secured to this framework and extend for the full vertical length of the vanes. Applied to the battens, as by means of an adhesive, is a layer of sound absorbing material 55 which may be approximately 6 inches thick. This absorbent defines air pockets between the battens 54; these air pockets further aid in dampening of the sound incident upon the baffle structure. The absorbent may be of a felt material or a plastic material, such as an open cell polyurethane foam, for example. The absorbent may be outwardly dressed or covered with a layer of cloth of almost any suitable material. Since spatial considerations limit the amount of absorbent which can be used, each baffle vane 52 may carry on each of its sides a pair of active free-field electronic sound absorbers 52a for added capacity and increased efficiency in low frequency absorption.

According to the preferred embodiment, the height of the vanes is approximately 4½ feet, with the distance between the distal end portions of diametrically disposed vanes being 4½ feet. The column 48 is dimensioned lengthwise to space the lower edges of the vanes approximately 2 feet apart from the level of the floor 10.

As will become more clearly apparent herein, the baffle vanes prevent spatial distortion when recording in auditory perspective using intensity sterophony by plural pairs of microphones. The vanes are also necessary to obstruct far-side sound sources. The baffle vane structure is of substantial mass so as not to transmit air-borne sound through the structure into an adjacent space containing additional microphone pairs.

The microphones

The present invention contemplates the normal use of two microphone systems, one relating to multiple pairs mounted near the apices of the baffle and the other microphone system being incorporated into a dummy head disposed beneath the baffle.

The column 48 mounts four pairs of microphones 56–59. These microphones are preferably of the pressure-gradient type and may be, for example, Neumann M 269c microphones or A.K.C. C–12 microphones. Although other types of microphones can be employed, the type capable of combined pressure and pressure-gradient operation is preferred because they provide a much better distance impression. Pressure-gradient microphones are of two types, electrostatic and electromagnetic. Of these, electrostatic microphones provide better fidelity and ability to withstand movement without undue noise generation, and are therefore preferred. Also, in general, electrostatic or condenser microphones have about fifteen to twenty decibels referred to 1 volt per microbar greater sensitivity than microphones of the electromagnetic type. Electrostatic microphones may have an unchangeable cardioid characteristic or they may have changeable directionalities, i.e., polar response patterns variable continuously or in discrete steps by means of a polarizing voltage remote control to a second diaphragm.

The distance betwen the sound sources, i.e., the musicians, and the microphones may be increased with the use of second-order gradient unaxial (bi-gradient uniaxial) microphones which have ribbon vibrating elements that are electromagnetic in nature. These microphones may be mounted on the baffle vane structure along with the pressure-gradient microphones and switch means may be provided for changing the input from one type of microphones to the other. In such an arrangement the final recording might contain separate recordings using either type of microphone and giving an impression of concentric rings of musicians when the baffle vane structure is in the center of its circular operating area.

The microphones are shock mounted by a full elastic suspension. Referring now to FIG. 6, the pair of microphones is shown to include an upper microphone 56 and a lower microphone 56' arranged in a vertical coaxial relation. A pair of rings 60 is supported from the column 48 by a pair of radially extending arms 61. The rings 60 mount elastic support arms 62 which in turn engage adjacent ends of bearing structures 64, these bearing structures also being supported by a plurality of flexible arms 65. Because the microphone pairs are given similar but opposite support from beneath, it will be understood that the bearing structures 64 are elastically or resiliently supported and rotatably support the two microphones for independent rotation about their vertical central axes, which axes are coaxial. The proximate ends of the microphones are received in a journal formation 66. It will be understood that the microphone mounting construction just described is identical with the means supporting the other three pairs of microphones.

The microphones 56, 56' may be simultaneously rotated in opposite directions about their common vertical axis by a compliant frame 68 which is in the form of a rod having a pair of arms 69, 70 contained in separate vertical planes, as best seen in FIG. 7. The microphone 56 has mounted thereon a friction band 72 which is yieldably engaged by the arm 69. Similarly, the microphone 56' mounts a friction band 73 which is yieldably engaged by the other arm 70. Since the arms 69, 70 engage respective friction bands 72, 73 on opposite sides, movement of the frame 68 in one direction will bring about simultaneous rotation of the microphone in opposite directions.

A cross-arm 75 has one end thereof connected to the frame 68, this cross-arm being permitted to move freely relative to the column 48, the latter being provided with a pair of diametrically opposed openings equipped with bearings to permit such free movement. The cross-arm 75 is engaged by a friction wheel 76 which is rotated in either direction by a small servomotor or remote positioner 78, such as a TORQSYN, Model VS–96, a trademark of the Vernitron Corp., Garden City, N.Y., which is a torque resolver equipped with an inmate matching transformer, suitably mounted within the column 48 as by means of a cross-brace 79. It will be understood the other end of the cross-arm 75 is connected to means identical to that just described for rotating the microphones 59, 59' simultaneously in opposite directions relative to each other. Referring to FIG. 6, in the embodiment shown, when the cross-arm 75 is moved to the left, for example, the microphones 56 and 59' will be rotated counterclockwise (viewed from top to bottom) and the microphones 56', 59 rotated clockwise. The opposite results are obtained when the cross-arm 75 is moved in the opposite direction.

Identical means are provided for rotating the other two pairs of microphones. As noted in FIGS. 6 and 7, another remote positioner 82 is mounted within the column 48 by a brace 83. This remote positioner drives a friction wheel 84 which engages a cross-arm 85, the latter mounting frames 86, 87. The frame 86 includes compliant arms 88, 89 of restorative bearing force, for respectively rotating the microphones 57, 57' (not shown). The frame 87 mounts arms 91, 92 for rotating the microphones 58, 58'. The coefficient of friction at the interfaces of the various compliant arms and friction bands which are preferably of the cellulose type, is on the order of 0.5.

The microphones of the pair may be rotated or declinated with respect to each other about their common vertical central axes when recording or broadcasting in auditory perspective by the use of stereosony type intensity stereophony. The microphones may be declinated or rotated in response to the degree of movement of the microphone supporting means to and away from the sound source. It is common for sound sources to create an impression of size and volume in relation to their distance to the microphone. If, for some reason, it is desired to change this ordinary relation of source distance to the apparent or illusory impression normally associated with it, such as for example, when desiring to retain an illusion of constant source size even though the microphones are being moved, such as through a complex motion sequence, the microphones are declinated so as to more closely approach a coincident orientation as the source recedes. Normally, as the microphones are moved further away from the sound sources that may be placed about the microphones, the source seems to contract in width. If desired, however, the sources may be "expanded" in proportion to the amount of movement between the source and the microphones by extorsion of the diaphragms of the microphones which has the effect of intorting perpendiculars to the diaphragms that represent the most sensitive directions; in other words, diaphragm extorsion reduces the included angle between two reference lines, each being perpendicular to the plane of the diaphragm and passing centrally therethrough. Or in other words, the directional orientation of the microphones may be moved in relation to the sound sources during movement of the microphones to and away from such sound sources.

Furthermore, intorting the microphones upon continuing rotation of the baffle also produces an impression that a particular source is actually moving closer to and then further from the listener as the baffle is moved so that a bisector of the baffle quadrant approaches and then passes the source.

Refence will now be made to the declination of the microphone within each set of microphone pairs. In keeping with the invention, the location of the microphones, which are mounted in pairs within the baffle, can always be defined by their instantaneous distance and direction from a position in the center of the executants. However, since the baffle rotates, thereby serving periodically to reverse the position of each set of microphone pairs, the relative position of each set of pairs with respect to its distance from a fixed source varies. Accordingly, the declination of such pair in traversing this cycle should vary accordingly. Furthermore, there is, by reason of the quadriform baffle, one other set of microphone pairs, disposed normal to the first set of pairs, and which may be thought of as lying parallel to a y-axis if the first set of pairs are considered as parallel to the x-axis. The same situation concerning distance from a reference source is present in this set of pairs.

Accordingly, it may be seen that, in traversing a 360° rotation, a given pair of microphones, in respect to sound sources located at north, east, south and west locations, respectively, for example, is initially a reference distance from the north source, and is unconcerned with the distance of the sources at the east or west. Upon 90° of rotation, declination of this pair should depend solely on the distance from the east source, Upon another 90° of rotation, and assuming that the baffle has not moved, but is only rotating, the distance of this pair from the south source will have become the complement of its distance from the north source when it was disposed facing north. In other words, since it will be relatively closer to the sound in the south position by an amount equal to the amount by which it was relatively more remote from a sound source in the north position, declination of the pair in the south position should desirably be proportional but of opposite polarity or extent to the declination in the north position.

The same situation prevails in respect to approaching the west sound source. When this is considered in connection with the fact that each microphone pair has an associated pair facing the opposite way, it will be understood that the degree and polarity of declination of all four microphone pairs must be arranged as set forth above for best results. The same situation is present in respect to relative distance and concomitant declination of the same set of pairs when it is facing first east and then west.

Furthermore, since the baffle will often rotate continuously rather than in measurably discrete movements, the transition between opposite polarity states must be gradual, and must take into account, in respect to a pair first facing north and moving to a position facing south, the first increasing and then decreasing importance of signals coming from the east source, for example. This is because although the distance from the east source is unimportant to declination when the baffle is in a position with the pair facing north, east distance is all-important to declination upon 90° of baffle rotating, i.e., when the pair faces east.

These desiderata are taken into account in the invention by reason of the provision of means now to be described wherein, in addition to distance changes occurring by reason of baffle rotation, the relative distances from any given sound source may and in fact will also change along $x$- and $y$-axes during performance of the composition by reason of translatory movement of the baffle. This declination of microphone within each pair which in an actual embodiment are arranged so the axes along which declination takes place are vertically extending coincident axes, is shown in FIG. 11 wherein the pair of microphones 56, 56' have been shown with this actually common axis displaced into axes $a$ and $a$–1 for purposes of clarity. Reference lines perpendicular to the planes of the diaphragms of these microphones are indicated by the arrows 56a and 56b. The maximum desirable angle subtended by these reference lines is 90°. As the baffle structure is moved or translated in a direction indicated by the arrow 94, the microphones 56, 56' are both rotated equally and oppositely about the coincident vertical axis, in order to decrease the included angle between the reference lines perpendicular to the diaphragm. An opposite movement of the baffle structure or microphone supporting means calls for opposite rotation or declination of this pair.

Referring again to FIGS. 6 and 7, and referring for example to only one pair of microphones 56, 56', which, as described above, are declinated by reciprocation of the cross-arm 75 carrying arms 69, 70 thereon, it will be apparent that such declination is in turn determined by the signal fed to the remote positioner 78. This signal indicates the relative position of the entire microphone and baffle assembly along one particular translatory axis, such as the axis parallel to the beam 22. This distance is always a function of the cumulative net number of turns undergone by the motor 28, since all movement along this axis results solely from rotation of this motor and its associated driving elements. Thus, a synchro transmitter 145 associated with this motor may be arbitrarily set with a null or zero position thereof at a given position of the cross beam carrying the entire assembly. For example, the null position will ordinarily be determined by the position occupied by the beam when the baffle is in the center of the circular operating area, and movement therefrom in either direction creates a signal of characteristic polarity and magnitude, which is fed to the remote positioner, which then reacts to the signal by creating a torque of the polarity and magnitude necessary to declinate its associated microphone pair to the indicated degree. As pointed out above, this inherently brings about an opposite polarity and magnitude declination in the oppositely directed but operationally associated microphone pair 59, 59'.

Referring now additionally to FIGS. 8 and 9, there are illustrated, for example, three fixed contacts 105a, 105b, and 105c, for operative association with the characteristic three conductors of a typical synchro transmitter and receiver set. These fixed contacts 105a, b, c are disposed within the sleeve 49 and engage movable contacts 90a, b, c which are fixed within the rotatable column 48 which forms a part of the entire baffle assembly "A," and accordingly rotates when the baffle is rotated, each contact has a conductor such as wire 100 associated with it for receiving a signal sent from a conductor connected to an associated contact, such as contact 105a, so that the remote positioner 78 receives the output of the synchro transmitter 145, for example.

Since, as pointed out above, if and when the baffle assembly rotates, it will be necessary for the microphone pairs to be operatively associated from time to time during rotation with the appropriate positioning or declinating information, for example, with an $x$-axis characteristic position output when faced parallel thereto and with a $y$-axis characteristic position output when facing parallel to the $y$-axis, and with a position-indicating output coming from both axes when disposed facing therebetween.

This is accomplished, for example, by providing plural sets of stationary contacts for successive association with movable contacts so that, upon baffle rotation, different conductors will be operatively associated with one another as rotation progresses. Thus, as shown in FIGS. 8 and 9, sets of contacts 104, 105, 106 and 107 are equally spaced about the periphery of the sleeve 49. Bearing in mind that these contacts are fixed, clockwise rotation of the column 48 will successively bring about contact between the group of contacts 105a, 105b and 105c and contacts 98a, 98b and 98c, thereby energizing conductors set 100 with the signal received at contacts 105, 105a and so on; then between the contacts 105, etc. and contacts 99, associated with conductors 101. Further rotation will bring about successive contact with 180° of insulating material, following which the cycle is again repeated. Contacts 105a, 105b and 105c always receiving $x$-axis information, i.e., parallel to guide rail 15, whereas contacts 104 accord to an axis at right angles thereto. For reasons referred to above, and which will now be discussed in greater detail, the conductors associated with contacts 107a, 107b and 107c are associated respectively with contacts 105c, 105b and 105a. Thus, considering known synchro systems to include three windings each having an associated terminal $S_1$, $S_2$ and $S_3$, 180° phase reversal is accomplished by reversing connection so that the $S_1$ conductor is attached to terminal $S_3$, the $S_2$ conductor is not changed and the $S_3$ conductor is attached to terminal $S_1$. In keeping with the above description of the operation of the microphone declination system, this brings about the association of the $x$-axis output with the desired microphone pairs when the baffle is rotating. Thus, referring again to FIG. 8, and assuming that "north" and "east" information is coming into contacts 105 and 104 at the indicated position for reception by the remote positioners associated with each microphone pair, and assuming clockwise rotation, at 45° rotation from the position shown, information to each position will momentarily be received from two contacts, with conductor 100 being associated both contacts 105 and 106, and conductor 101 receiving a signal from contacts 104 and 107. Receiving the signal from two sets of contacts, as is well known in the electrical arts, will bring about an averaging of the two inputs. Simultaneous contact occurs since the width of the face of the contacts 105, 104 is greater than the circumferential spacing between the ends of the adjacent conductive strips 98, 99 associated with the conductors 100, 101; the contact strips 98, 99 are long enough to extend between adjacent contact sets 104, 105, etc. Upon further rotation, the conductors 100 and 101 will be fully associated with signals coming from sets of contacts, 106 and 105. This will position the microphone pair previously moved to a "north" position in respect to an "east" position. Upon 180° further rotation, the same pair will receive equal but opposite or "west" information, since although its associated sender is sending an "east" signal, the polarity thereof is reversed, since $S_1$ and $S_3$ terminals on contacts 104 are cross-connected in respect to their connections at 106.

As will be explained hereinbelow, movement of the unit 36 is controlled by a numerical control system for covering a circular area 111 (FIG. 1) within the recording studio. The diameter of this area is governed by the sensitivity of the microphones used, i.e., the pickup distance capability of the microphones, minus the radial dimension of the baffle vanes 52. Using the aforesaid combination pressure and pressure-gradient condenser type of microphones, it has been ascertained that desirable results can be achieved if the circular area covered within the studio and thus the well port 14, is 14 feet in diameter. As shown in FIG. 1, the musicians are seated around the periphery of this circular area. According to the illustrative embodiment, the microphone and baffle assembly is mounted for translatory and rotational movement with the microphones at generally the same horizontal level as the musicians. It is within the scope of the invention to have the microphones and baffle vanes mounted above the performers in which case vertical distance compensating means to cant the microphones downward may be provided to prevent any loss in coverage because of vertical displacement of the microphones from the players.

The impression of distance change to players disposed about the circular well or operating area whether or not the microphone baffle assembly is stationary may be obtained by adjusting the control knobs on reverberation units 112a–112d (FIG. 8) associated with microphone pairs 56–57', 57'–59', 58'–59, 58–56', respectively. Ganging these remote control knobs and operating them in common by an associated electric motor, for example, in response to signals on the numerical control tape, adjusts the degree of reverberation in compliance with the composer's wishes. For example, reverberation increased by this means produces the effect of more distant sound sources.

It should be mentioned that the Neumann M 269c microphones are of the continuously variable directionality type. The directionality control knobs (not shown) associated with such microphones may also be controlled by the numerical control system to be explained hereinbelow. As opposed to continuously variable directionality, the microphones may be of the type which have directional control corresponding to discrete steps of a control knob. Of course, as mentioned above, suitable results may be achieved by using microphones having an unchangeable cardioid response pattern.

Directionality control of the microphones, as opposed to declination or rotation of the microphone pairs themselves about their coincident vertical axis as explained above, is desirable, in that it permits the resultant impression of spatial definition of the sound sources i.e., as to a discrete-diffuse gradient to be varied, and thus permits effects involving "swelling" and "coalescence" of the sound sources with concomitant musical and psychological effects. That is, a relative or more omnidirectionally responding microphone will produce an apparently more diffuse impression and a microphone having more pronouncedly directional response will produce an effect of a more definitely located virtual sound source. As will appear more fully herein, however, although declination, directionality control and control of reverberation are desirable, none is strictly essential to practice of the invention.

Microphone control means and associated equipment

Figure 10:
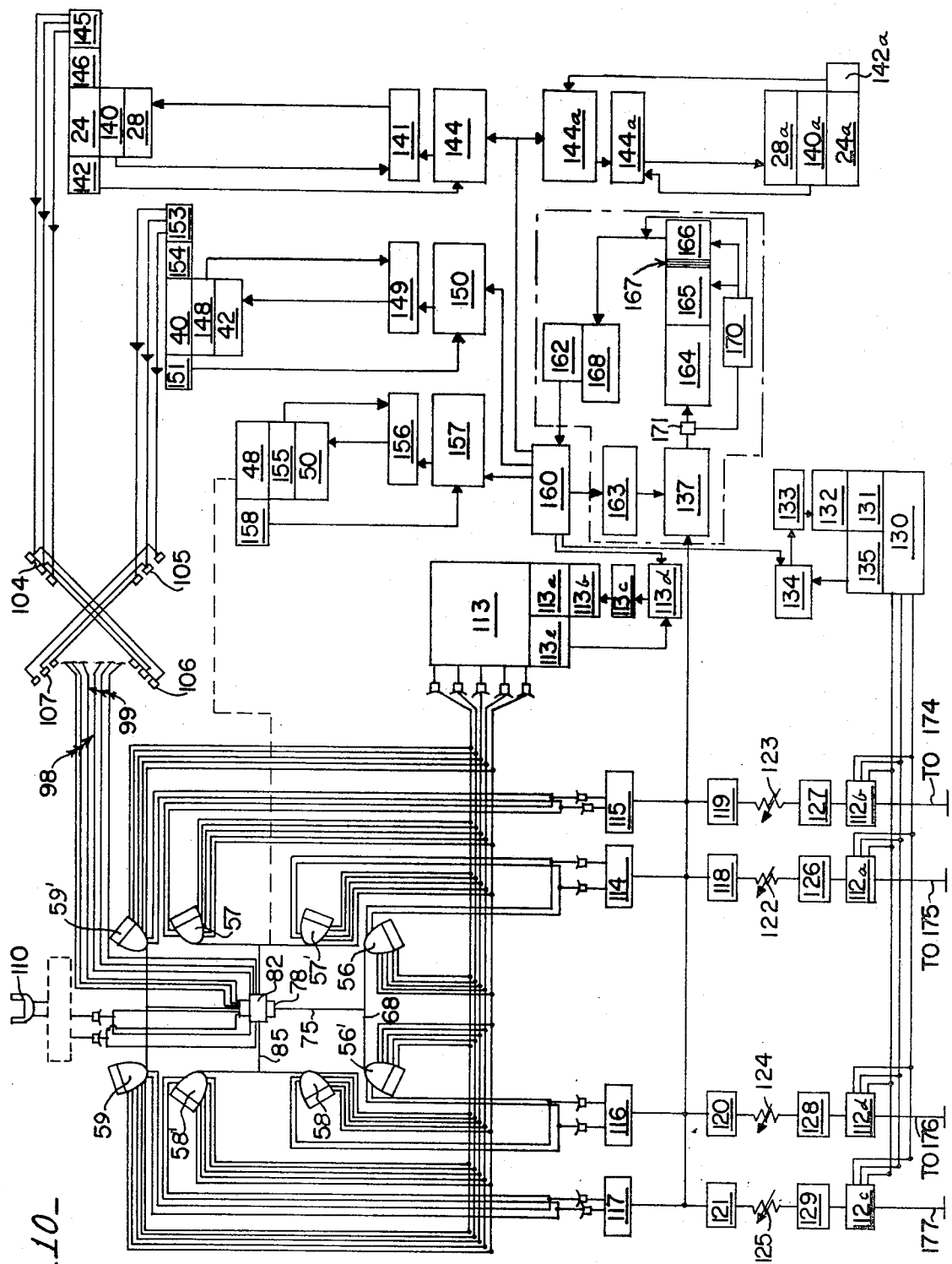
FIG. 10 is a diagrammatic view, largely schematic, and primarily showing the numerical control system.

The microphone power supply 133 including its associated directionality control unit ordinarily in the form of a control knob or the like 113a is illustrated somewhat diagrammatically in FIG. 10. The directionality control unit having the knob 113a as generally pointed out above, is operated by a small D.C. servomotor 113b, which may be of either the printed circuit or torquer type, for example. The servomotor 113b is energized from a servo amplifier 113c which in turn receives signals from a servo differential, such as a comparator or error register 113d reflecting the difference between the intended baffle position and the actual position of the baffle in a particular axis. A position transducer 113e supplies information to the differential 113d reflecting the position of the directionality control knob 113a.

The pickup of the microphones 56, 57' is supplied to an amplifier 114; the pickup of the microphones 57, 59' is supplied to an amplifier 115. Similarly, the microphones 56'$_2$, 58 are connected with an amplifier 116; the pickup of the microphones 58', 59 is supplied to an amplifier 117. These amplifiers are connected to identical combination units 118–121, respectively, which are meant to represent compressors, equalizers and filters. These units are in turn connected to respective gain controls such as potentiometers 122–125, these components in turn being connected to further audio amplifiers 126–129, and so on, in keeping with known practices in formulating high quality audio channels.

Reverberation control is accomplished as desired by the provision of a servo system in which the degree of reverberation is controlled in relation to the intended amount thereof wished by the composer or director to be used at a particular point in the score. Thus, a portion of the tape of the numerical control system used to control the position of the baffle assembly feeds information to one portion of a differential 134, such as a comparator or error register, and the other portion of the differential 134 is fed by a signal from a position transducer 135 reflecting the actual position of the reverberation control knob 131 or the like. Thus, the differential may compare the intended position of the control knob 131, with the actual position thereof and feed the resulting error signal to a servo amplifier 133, from which it may in turn be fed to a servomotor such as a torquer or printed circuit motor 132 attached to the control knob 131 or shaft for performing the required adjustment to the reverberation control. This principle, as will be brought out further herein, is also applicable to operation of the microphone directionality control. The other and further characteristics of the numerical control system itself, of which the differential-feeding tape forms a part, will be described in further detail herein, it being understood that it is primarily intended to position the operative parts of the system in the places and sequences desired by the composer or director. Reverberation units 112a–112d may typically be of the Neumann EMT–140 type. Bauer S–1000 reverberation units (Bauer Electronic Corporation) are also satisfactory.

The Neumann M 269c microphones referred to herein each have five conductors extending to the power supply unit 113 and the associated directional control system and therefore, each microphone has five conductors or leads associated therewith, and accordingly five slip rings are required for each microphone, except that many slip rings can be eliminated by sharing of these rings by certain conductors. In addition, four slip rings are provided for establishing connections with a dummy head 110 connected to the lower end of the column 48. It is understood the number of these conductors will vary with the kind of microphones used, some microphones using as few as two conductors. These microphones having continuously variable directionality or polar response pattern will be controlled by the numerical control system referred to above.

The reason a remote microphone power supply is provided is that microphones of the type useful with the invention may include only microphone preamplifiers and do not include a power supply, and because a power supply is required to operate the directionality control. Only these conductors which convey power supply and directionality control are shared by all of the microphones. Each microphone has two other conductors representing the modulated (audio frequency conveying) conductors. From FIG. 10 it is noted that conductors connect pairs of the microphones, one on each side of a baffle vane, for establishing four composite inputs to the four groups of audio components or channels, each channel having at least one amplifier, such as amplifiers 114–117 and a reverberation unit such as units 112a, 112b, etc. As will be explained hereinbelow, the pickup from each of these pairs of microphones will emit from the same loudspeakers.

At this point, it must be understood that the pairs of microphones now being referred to, and which, as a pair, feed a single audio channel, are those microphones having their respective reference line directed generally parallel to each other so that the pair may be said to "look" in generally the same direction. Such microphone pair is referred to herein as a "common channel pair" and is to be distinguished from the vertically coincident microphone pairs lying within the same pair of baffle vanes, and wich were referred to above in connection with the discussion of microphone declination, polar response control, etc. Although they are not specifically shown in detail in the drawings, it will be understood that, in keeping with common audio practices, the differential transformers, by which sum and difference signals are obtained, and which characterize the lateral positioning of the source, are included in the system. It should be pointed out that the four composite channels just referred to are all connected to a bank of tone detectors 137 which includes a plurality of individual detectors each responsive to a selected tone frequency, the purpose and makeup of which will be explained below. Suitable tone detectors can be obtained from IBT Instruments, Inc., New Haven, Conn., for example.

The channels or conductors from the binaural dummy head 110 have not been shown in FIG. 10 since the means of connection of these conductors to associated channels is well known and does not form a necessary part of the present invention. Also, the electrical connections to the sound absorbers 52a are conventional and therefore are not shown. Such a dummy head 110 or cephaloid microphone may be purchased as standard equipment or may be constructed from a rigid sphere with forwardly incanted omnidirectional (pressure) microphones, with perhaps added pickups to eliminate phantom sources. The dummy head may include pinnae or auricles to aid in front-to-back discrimination of sound sources locations. This dummy head is used to produce binaural recordings which may be made simultaneously with recordings being made by means of the various microphones 56–59. Further, such microphones on the dummy head permit the musicians to monitor themselves along with any other constituent take of the total mix made through a dummy head.

It will be noted the players illustrated in FIG. 1 are shown wearing headsets 138, for this purpose. These headsets may be connected by suitable means, as by the conductors 139, to the microphones in the dummy head. Headsets may similarly be provided for the conductor and members of the technical crews.

The numerical control system

Referring now to a very important feature of the invention, it was pointed out above that, in keeping with the object of producing novel musical effects by moving the microphone support unit about, with or without rotation thereof, it is necessary to provide some means of accomplishing this movement, particularly in view of the inability of a human operator to manipulate the microphone or pickup assembly as a whole, and particularly to do so with precision and repeatability as will be necessary to obtain the desired musical effects upon repeated musical performances, as well as the inability of such person to bring about associated movements of the microphone pairs and equipment associated with the microphones, that is, equipment for declinating of microphone pairs, changing of directional characteristics of the microphones, changing reverberation characteristics thereof, and the like. All of these changes may be made continuously during pickup of the music, with some of the movements being carried out as an inherent predetermined function of other movements such as baffle position or orientation, and other movements, including the movement of the baffle itself, being carried out according to a preset or predeterminable program related to the intentions of the composer, conductor or recording engineer. In addition to these movements, various acoustical and audio parameters may be varied by electrical control in response to the such intention.

In the present invention, the function of physical movement is carried out by the system of pulleys, motors and the like described above, under the control of a so-called numerical control system, which is adapted to provide precise positional control of the pickup means in response to program information which may be stored in a known manner, such as on magnetic tape, punched cards, punched tape or otherwise, and then supplied to such numerical control system to bring about the indicated movement of the components.

As further pointed out above, another feature of the invention is the presence within the total system made according to the present invention of means for controlling the so-called average feedrate that correlates with the rate at which position information contained in the program is fed to the means for moving the microphones and varying the audio and acoustical parameters, so that the movements and responses of the pickup means will not only follow the positional and other sequences set forth in the program, but will follow the program at the same rate or tempo at which the music is actually being played, whether or not this tempo is that intended by the composer, for example. For this reason, a so-called pacing system also to be described herein is provided in which characteristic signals in the music itself are picked up as the music progresses, and the actual time at which the signals is detected is compared with the intended or predicted time at which the signal should be detected, thereby indicating whether the average rate of data input which with subsequent components controls the movement rate of the pickup means should be increased or decreased from time to time over any given interval.

Referring now to the numerical control system shown in block form in FIG. 10, we have shown only those components which are generally found in any numerical control system although the specific nature of these components and the number and kind of components interposed between those shown may be different in any one numerical control system.

Thus, referring now only to a single axis of control, namely the vertical axis (sometimes referred to as the "C" axis) about which the baffle is rotated, means are shown for reading numerical control data input, such as a tape reader 160, and means in the form of a differential 157 for comparing an attained position signal emanating from the position or displacement transducer 158 with a desired position signal emanating from the reader 160. The output of the differential 157 is an error signal which is amplified by the servoamplifier 156 and fed to the servomotor 50, thereby causing rotation of the drive shaft 48 (FIG. 4) to position the baffle with respect to the axis under consideration. Velocity stability is provided by the tachometer-generator 155 mounted on a shaft common to the servomotor 50. Output of tachogenerator 155 is fed back to the servoamplifier 156, as shown, forming a closed loop.

Referring now to another axis capable of being controlled by a signal from the tape reader 160, FIG. 10 also shows a y-axis differential 150, a servoamplifier 149 for the signal generated thereby, a torquer 42 driving shaft 40 for translating the baffle in respect to the y-axis, a position transducer 151 for creating a signal representing the absolute instantaneous position of the baffle in respect to such axis and a tachogenerator for servo stabilization of baffle movement velocity by feeding back a signal proportional to baffle translational velocity to the servoamplifier, thereby forming a closed loop. It will be noted that in referring to a number of the elements comprising the control system, some of these elements appear only diagrammatically in FIG. 10, whereas the physical form or embodiment of some of these elements is best shown in FIG. 4.

Also associated with the drive shaft 40, for positioning the baffle in relation to the y-axis are means for declinating the microphones so that declination thereof will be proportional to the position of the baffle in that axis. While in certain cases, this function may be carried out by position transducer 151, for purposes of illustration, a separate means is shown in FIG. 10 in the form of a reduction drive 154 operatively associated with a synchro transmitter 153, the output of which is fed to the torque receiver 82, which positions the vertically coincident microphone pairs to bring about the desired declination as described above in connection with the description of FIGS. 6 and 7.

Similar control for the x-axis is provided in the form of differential 144, amplifier 141 having feedback tachogenerator 140 associated therewith, and serving to drive torquer 28 to cause rotation of shaft 24. The reduction drive 146 operates synchro transmitter 145 for declinating the other set of microphone pairs in accordance with their position in relation to the x-axis from time to time.

Referring now to FIG. 4, the position transducer 142 also feeding differential 144 has been represented as a two-element unit. This illustrates the fact that such transducers commonly comprise both fine and coarse resolution feedback units where great movement of the components is contemplated.

Since the support for the baffle on one axis includes the massive cross beam 20 which is driven from both ends thereof, differential 144a, amplifier 141a, shaft and torquer 24a, 28a, and tachogenerator 140a are provided to control motion of this end of the beam 20 to prevent off center forces from displacing the beam from a position transverse to its guide rails 15.

In addition to the physical positioning axes of control concerning microphone location and consequently implicit directional orientation of vertically coincident microphone pairs, the reader 160 also is capable of controlling audio and acoustical parameters by reason of control of reverberation and microphone directionality. Thus, the output of reader 160 is supplied to a differential 113d, which produces its error signal by comparison of the command signal emanating from the reader 160 with the output of the position or displacement transducer 113e which senses the position of the polarizing voltage control 113a of the microphone power supply 113. The position of the voltage control is moved by the servomotor 113b which receives a signal fed to it from differential 113d through servoamplifier 113c Referring now to control of reverberation, it will be seen that control of the artificial individual reverberation units 112a, 112b, 112c and 112d is accomplished by comparing a signal emanating from reader 160 with a signal received from transducer 135, indicating the degree of reverberation present at a given time, and furnishing the error signal to amplifier 133, from which the amplified signal is fed to the servomotor 132 associated with a control element 131, which in turn is associated with the diagrammatically illustrated reverberation control assembly 130.

Referring now to typical numerical control systems and components thereof, a magnetic numerical control tape reader (with variable velocity servo drive) is indicated as 160; Ampex Corporation of Redwood City, Calif. makes a suitable magnetic tape recorder, but such reader does not include a continuously variable speed control. Such a speed control is necessary to the pacing system referred to above, and which will be described in greater detail herein. The numerical control system itself, the essential function of which were shown in block form in FIG. 10, may be for example, that "Mark Century System" manufactured by General Electric, which is of the digital internal interpolation, (mixed linear and circular), contour type; this form uses implicit digital information input. However, it will be understood it is within the scope of the present nvention to use a numerical control system of any of the following other types: analog, digital, (either being with or without external interpolation) digital incremental, digital positional, analog positional, or other known system or combination of systems.

Referring now to such other types of systems, one such other system is a Ferranti manufactured digital incremental pulse-count system using constant feedrate servos. The components thereof include the magnetic tape deck, pulse rate meter, differential (in this case a bidirectional counter or summing register), mixing network, compound amplifier including digital to analogue convertor, stabilizing network, and balanced output amplifier, which feeds an hydraulic motor via an hydraulic servo valve. A tachogenerator is operatively associated with this servomotor. Movement in this axis of control is transduced by an optical grating feeding a counter and converter that also receive the command pulse input from the magnetic tape and feed into the mixing network. The tachogenerator output is given to the differential via an acceleration feedback network. Another such system suited for use with the invention is that of the analog interpolating variable feedrate type, manufactured by Electrical and Musicial Industries. In this unit, a variable feedrate controlling servo system is directly linked to the interpolator and its associated components in the control cabinet and consists of analog differential giving the error voltage resulting from a comparison of two alternating voltages of varying amplitude; this error voltage is given to the mixer network that feeds an amplifier-demodulator. This in turn feeds a phase advance network which furnishes a signal to the compound servoamplifier, the output of which is fed to the motor. A tachogenerator feeds back motor velocity to the mixer network via an accelerator feedback network. The position measuring device feeds the differential. This latter type may be used but as it uses implicit information, input is not specifically shown in detail herein.

Scoring

Since a principal object of the invention is the provision of a method for permitting the production of musical effects, and these effects are contingent upon the spatial disposition of the sources, it will be clear that some notational method must be provided whereby the composer may indicate in what way he intends the baffle assembly moved as his work unfolds. An important feature of the preferred notation system is that it is arranged so that the movements indicated by the rotation are analogous to the physical motions undergone by the baffle.

As noted in FIG. 12, a grid coordinate system may be conveniently used to indicate the translational position of the baffle and microphone means from time to time with respect to the circular area 111, in the recording studio which is bounded by the performers. In FIG. 12, the locations of the musicians are represented by the sketches of the musical instruments they play. For purposes of establishing the rotational position of the baffle and microphone assembly, reference will be made to an arbitrary "north" direction from which other directions may be measured. Furthermore, the position of the baffle as a whole may establish an arbitrary reference point or origin from which translation may be measured. The graph illustrated is oriented so that one axis thereof lies in a north south axis and so that the origin of the graph represents no baffle translation.

FIG. 11 shows the manner in which the composer marks the musical score to indicate the intended baffle position. The symbol "27 F 263°" means that when the musicians are at the portion of the score just beneath that symbol, the baffle and microphone assembly should be located at coordinates 27 F and should be such that the "zero" or north vane is disposed on a 263° radial. Still referring to FIG. 13 the symbol which includes "263°—235°, 1 rev./4 sec."

means that when the musical rendition has proceeded to the portion of the score so marked, the baffle and microphone assembly should commence rotating in a counterclockwise direction from 263° and should rotate at the rate of 1 revolution per 4 seconds until the zero axis of the baffle and microphone assembly has been rotated to 235° for a stated number of bars or on the tone associated with the cessation of such movement as indicated by an ending mark. During this time, or thereafter, either coincident with rotation or in the absence thereof, the baffle may be translated as indicated by the same type of information or notation on the positioned portion of the score.

The musical score so marked by the composer is given to a programming engineer. The engineer then programs the numerical control system so that the desired translational and rotational movements of the baffle and microphone assembly will be carried out as those scored by the composer. The composer may also provide the programming engineer with the necessary information concerning microphone directionality, reverberation, or other independently adjustable variables, in a notation customarily used for such purpose. The metronomic indication of the music is present on the score, and therefore the engineer will have all the information necessary to establish the pattern of movement of the baffle and microphone assembly, as well as control of other parameters. It will also be appreciated that if the composer does not wish to indicate intended baffle rotation or baffle movement but wishes only to indicate the relative location of an apparent sound source during playing of the composition, he may indicate, such as by a notation on the musical score under the voice line of the instrument in question, his desires in regard to the pathway or progression such source should follow. This notation will form the basis for a program which, when fed to the control system, will bring about baffle movements resulting in the desired movement of the virtual sound sources along the desired pathway or progression. Such notation may consist only of a sequence of salient contour points drawn from the grid used.

The pacing system

As indicated above, it is desirable to provide means for pacing or controlling the rate of movement of the baffle vane and microphone assembly in response to variation in the tempo of the composition as played in contrast to the indicated or intended metronomic tempo. For example, assume twenty minutes are implicitly indicated in the metronomic marking as being required to perform a certain musical composition. At the expiration of, say seventeen minutes, the numerical control system, which is programmed so as to maintain great temporal exactitude in carrying out the motions indicated, would therefore always instantaneously have the baffle and microphone assembly in a very precisely predetermined translational and rotational position. This position would exactly correspond to a specified point in the musical score, provided the metronomic tempo is exactly achieved by the musicians. However, at the expiration of such seventeen minute period of time, for example, the musicians might be executing a part of the score which is significantly ahead of or behind the position in the score corresponding to the portion of the score being read by the control system. Because the performers will rarely if ever, perform in perfect tempo or time (it may be undesirable even to attempt to compel them to do so), the precise results desired by the composer to be brought about by baffle movement will therefore not be achieved.

To achieve to the maximum extent possible the novel musical effects desired by the composer, the movement of the baffle and microphones are paced to adapt to variations in tempo or time. This is brought about by adapting or varying the "average feedrate" or the rate at which the baffle moves under the control of the numerical control system.

In this connection, it will be noted that the term "average feedrate" is commonly used with machine tools controlled by numerical control systems. In this context, the term refers to the rate at which work is fed to the tool, or the tool advances on the work, not to the rate at which the tape or other source of information is fed to the reader. However, it is clear that varying the rate of information input to the reader will bring about a corresponding alteration of the feedrate. In the present invention, the term average feedrate refers to average interpolator emission rate, that is, it corresponds to the rate at which the baffle is moved to a succession of various positions as called for in the program. This feedrate is changed by correspondingly changing the rate at which the tape or other program is made to progress through the reader. The pacing system under consideration is able to alter the progress rate of the tape through its associated reader in a manner now to be described.

Synchronization between this average feedrate and the rate at which the players perform the composition is accomplished by this pacing system. The essential elements in the pacing system include a time measurement mechanism for determining the rate at which the composition is being played by comparing an intended elapsed time between the occurrence of a "command" signal, which is an auxiliary order fixed in place on the tape and the time a characteristic frequency responsive detector is actuated and the time which actually elapses between these events. The system also includes a sending unit for providing and sending a signal to bring about an adjustment of the speed control mechanism which intermittently sets or resets the rate of the numerical control reader. Since the mechanism is one which merely resets the speed control from time to time, means are provided for operatively associating the sending unit with the speed control only after the sending unit has reached a setting indicative of the degree to which the actual musical tempo is slow or fast in relation to the intended tempo, and not during the time the sending unit is being moved to this setting, or is in a quiescent phase in which it is not being moved or is not intended to be moved.

Usually, when the numerical control input information is explicit, i.e., includes interpolated points which may be generated by a remote general purpose digital computer in conjunction with a differential analyzer or curve generator (such system is termed "non-interpolating" due to the absence of interpolators in the numerical control console), the average feedrate is altered by adjusting the input of the magnetic tape to the numerical control system. In almost every practiced interpolating system— meaning a system which accepts implicit information— average feedrate is adjusted by varying average interpolator emission rate and this may be effected by suitable control means usually supplied by the maker as a standard feature, depending on the system used.

The numerical control system represented in block form in FIG. 10 can embody either an interpolating or noninterpolating system. The reader 160 of the control system is able to have its average reading speed governed by an associated control in order to govern average feedrate, that is, the average movement rate of the microphone and baffle assembly. In an interpolating system, the reader is usually either a punched card or punched tape reader; in a non-interpolating system, the reader is usually a magnetic tape transport.

In the embodiment shown, the speed control means is in the form of a variable frequency oscillator 162 which varies the speed of the magnetic tape transport driven by a hysteresis-synchronous motor. Alternately, for example, speed control may be a variable reference voltage used to vary the velocity of one or more direct current torque motors driving the tape transport. The pacing system also includes a stepping switch 163 used as a sequence control to determine which individual tone detector of any array or bank of tone detectors is to be energized for subsequent actuation upon "hearing" the frequency to which it is responsive. This stepping switch 163 is programmed by means of a matrix switchboard or plugboard which may interchangeably sequence the order of detector insertion in the circuit. The switch itself has a stepping or movable contact engageable with successive contacts, only alternate contacts of which are connected with the system. Actuation of the detector causes an associated relay to initiate motion of a timing motor 164 and to actuate a brake 165 to connect the timing motor shaft to a rotatable synchro transmitter 166. The timing motor 164 refered to just above may be a printed circuit motor, and is preferably connected by means of a relay with a preselection tone detector bank 137. This motor 164 is preferably adapted to engage the synchro transmitter 166 through a reset mechanism which includes a spring arm 167 adapted to return the synchro transmitter 166 to a fixed, predetermined starting position after the brake 165 is released. The synchro transmitter 166 is operatively connected with a TORQSYN or other torque receiver 168 which is in turn associated with the variable frequency oscillator or reference voltage control 162. Since the torque received, at a particular point, must be permitted to assume a position dependent on the signal it received from the synchro transmitter 166, the brake and synchro transmitter settings must be preserved for a long enough time to permit the torque in 168 to assume its intended position, even in those instances where the relative settings for the knob are disparate, especially where the new input constitutes a transient for the TORQSYN 168. This TORQSYN typically has a synchronizing time of 0.2 second so that the timer 170 should establish a constant repeat interval of about 0.25 or 0.3 second. This action is brought about by the time delay relay or timer 170 which actuates the brake 165 to keep the transmitter 166 engaged with the motor 164. The motor 164 is stopped upon receiving a signal from the detector 167 and cannot be reversed, since it includes a ratchet or overrunning clutch for this purpose. Therefore, the spring arm 167 tending to return the TORQSYN to zero position cannot do so until brake 165 is released by the action of the relay 170.

The reason that the variable frequency oscillator or average feedrate control 162 is not continuously connected to the timing motor 164 is that the setting of the oscillator must not be changed while it is determined wheher a new setting is necessary and if so, while the setting is being made. Generally, the detectors 137, below 500 Hz. are band pass filters which may be used in tandem or cascaded; from 500–8,000 Hz. they are tuning fork filters; and above 8,000 Hz. they are tuned reeds.

Referring now more specifically to the operation of the pacing system, it will be assumed that music is being played and that a pacing order on the tape is approaching the reader 160 and will be transmitted by the reader 160 to the other operational components of the pacing system.

The reader 160 transmits an order to the stepping switch 163 which advances to a position in which one contact is able to energize one detector 137 of the bank of detectors. At the same time as the detector is energized, contact is also made such that the timing motor 164 is energized and starts to rotate at a precise, predetermined angular rate. In addition, at the same time the motor 164 and detector 137 are energized, the brake 165 is actuated to clamp the rotating shaft of the timing motor 164 to the rotatable shaft of the synchro transmitter 166. Accordingly, the synchro transmitter 166 will be moved to a given angular displacement proportional to the length of time during which the motor has been actuated. During this rotation, the arm 167 having a return spring associated therewith and connected to the synchro transmitter is moved so as to tension the spring.

Assuming now that one characteristic musical tone intended to be detected and occurring at some point in the musical score is played by the musicians and detected in a well known manner by the particular tone detector then energized, this detector 137 emits a detectable signal which is received by a relay which operates to de-energize the timing motor 164, thereby causing the synchro transmitter to cease rotation and occupy an angular position which is proportional to the time which has elapsed between the time the motor 164 was energized and the musical tone was played. If the tone is not received at exactly a predetermined time indictaing that the musicians are executing the score at the desired metronomic tempo, the synchro transmitter will be angularly positioned either clockwise or counterclockwise of a given reference position. Assuming that the speed control 162 includes a rotatable knob having operatively associated therewith the TORQSYN or torque receiver 168 referred to above, and that the receiver 168 occupies a position at which the speed control knob is set for a predetermined feedrate corresponding to the average feedrate desired when the musicians are executing the score at the metronomic rate called for, it will be appreciated that when an appropriate connection is established between the synchro transmitter 166 and the torque receiver 168, the knob of the speed control will be moved so as to increase or decrease the feedrate established by the immediately prior position of the knob.

Accordingly, once the timing motor 164 is deenergized, the synchro transmitter is positioned and an electrical connection between transmitter 166 and TORQSYN 168 is established and maintained as pointed out above, by time delay relay 170 for a time sufficient to permit the receiver 168 to index to a position corresponding to the position of the transmitter 166. After this predetermined time elapses, the connection between the transmitter 166 and receiver 168 is broken and brake 165 is released and the spring returns arm 167 associated with transmitter 166 to its initial position. The mechanism has thus been reset to zero while the knob has been repositioned if and to the extent the intended and the actual tempi differ from each other. Since as pointed out above, it is either unnecessary or undesirable to reset the feedrate control too frequently, and since the tone detector selected for the actuator will respond to such tone whether it is the tone intended to create a response, the stepping switch serves to inactivate the pacing mechanism by moving to a position wherein unwired contacts are presented thereto.

PROGRAMMING

In making a recording according to the invention, the programming engineer selects the most suitable tone signals in the music for actuating the appropriate tone detector in the preselection tone detector bank 137. The particular detector is selected so that the tone to be responded to will, upon occurrence thereof, be alone in its register to the extent required by the selectivity of the detector being used. A management order from the reader 160 advances the stepping switch 163, the alternate contacts of which are unconnected as just described, so that a detector will not be activated at a time when its triggering would be spurious. The stepping switch will be advanced to the next connected contact a few seconds before the tone corresponding to the detector frequency that contact makes is expected to occur. All detectors should be "off" during the time in which a musical tone signal is not anticipated as this would likely result in spurious triggering. Musical points in time, as metronomically indicated at the head of the musical score, can be correlated to tape length traversed in a like amount of time and thus to tape management orders in time of stepping switch placement along the length of the numerical control tape traversed. This time, in anticipation of predicted time at the established speed, must be the same, as precisely as possible, for the activation of each successive detector. Anticipation time relative to tone detector energization is necessary as the musicians may anticipate their own previously established tempo and the amount of anticipation time allotted represents faster than established tempo tolerance (tempo is the flux-rate of metric or isochronous pulses). If the musicians anticipate or lag behind (perform faster or slower, respectively) than the established tolerance, the subsequently activated detector will not receive its intended corresponding characteristic musical signal tone and will remain "on" rather than be turned "off" by the intended musical signal tone. The detector will remain "on" continuing operation of the timing motor 164 and the brake 165 which engages the shaft of the synchro transmitter 166, which serves as input to the actuator controlling average feed rate of the reader 160.

Consequently, it is arranged so that beyond a certain rotation of the timing motor tending to decrease the numerical control average feedrate, a suitable switch (not shown) will be triggered, shutting off the entire numerical control system.

This is necessary as detector activation that is not stopped by occurrence of the predetermined musical signal, i.e., the intended signal is missed because of occurring too early or too late, is a self-preserved or propagated error; in either case, the average feedrate control is rotated to its limit and all subsequent executed reference musical signals will thereafter preced the energization of the detectors with which they are intended to be associated, and hence, such detectors will not be able to be activated.

Such a degree of deviation would, of course, require remaking of the constituent recording involved, but as a practical matter this should occur very rarely.

The speed of playing by the performers is inversely proportional to the amount of time the control knob associated with speed control 162 is permitted to rotate before it is stopped by the musical signal, by reason of actuating a relay via its associated detector, turning off the control which is the source of its rotation, i.e., the timing motor 164, by way of the timing motor relay 171 associated therewith. Thus, if the players accelerate in terms of tempo, the control knob will stop short of its predetermined "zero" position and cause the average feedrate to be greater, so that a subsequent reference musical signal will be taken with the then-established corresponding or synchronizing average feedrate represented in relation to that average feedrate which would correspond to the metronomic tempo. That is to say, as the musicians play, they will establish tempi and subsequently depart from these tempi. The overall process is of a cumulative nature, each newly established tempo relating to the just previously established tempo. The average feedrate control similarly relates corresponding-to-tempo average feedrates in terms of the corresponding-to-just-previous-tempo average feedrate, provided this falls within its operational range. If the musicians persistently alter this tempo and thereby the average feedrate, they may exceed the limits of the control of the average feedrate, and the recording process will be terminated by known means not further described herein. This is desirable for obvious reasons.

The recording and reproduction means

Assuming now that it is wished to make a tape or phonograph recording, such recording could be made in the manner now to be described.

Referring now to particular to FIGS. 10 and 10A, the four so-called channels designated 175–178 whether or not multiplexed, drawn from the four pairs of cooperating or channel-sharing microphones, define the input of a magnetic tape sound recorder 178 or recorders functioning synchronously (FIG. 10A). This recorder or recorders will have at least a four channel dubbing capability. If a binaural recording by the dummy head 110 or cephaloid microphone is made simultaneously with the recordings from the four pairs of microphones, such recorder would have six channels, in other words, such recorder should be capable of multi-six channel dubbing. This is quite preferable to sound-on-sound recording because it avoids high frequency cancellation and renders it impossible to damage previously made valuable recordings, since the performance recorded on separate channels may therefore be removed without damage to such valuable recordings.

The drawing showing two sets of channels 174–177 extending from the recorder 178 is intended to indicate that the dubbed performances (four channels each—six channels with binaural) are simultaneously fed to a four channel recorder 180, the two channels 174, for example, defining a composite channel 174'. Such composite channels are made by the use of suitable mixing controls 181, 182, the nature and operation of which are known to those skilled in the art.

Processing equipment needed to make a four channel tape recording or a two channel binaural recording is schematically represented as 184. A home tape recorder is indicated at 185; this recorder will have a four-channel playback head or will work in conjunction with a decoding device when these channels have been reduced in number by reason of being multiplexed. The channels of this recorder are schematically indicated as 186–189. It is understood the channel 186, for example, would include the pickup of microphones 57, 59'.

The output of this tape recorder will drive four loudspeakers 190–193, these speakers reproducing the musical signals of respective recorder channels 186–189. An overhead view of a listener 195 is shown in FIG. 10A. The loudspeakers are preferably equally spaced from each other and equally spaced from the head of the listener to produce in the preception of the listener the novel musical effects brought about by the present invention. Such musical effects may produce in a listener the illusion of being surrounded by sound sources and may also produce the illusion of independent and unique complex movement of each such sound source, depending on the manner in which the baffle and microphone assembly is being moved during the time the recordings in auditory perspective are being made.

When a binaural recording is made, such recording may be played back through the usual two channel tape recorder in which case the listener may hear the musical rendition through a binaural headset. It is understood that the present invention embodies both the making of an auditory perspective recording using the microphone and baffle assembly as well as using the dummy head, the former producing a multi-channel (at least three) recording and the latter producing a binaural recording, each inducing novel musical effects in the perception of the listener.

With respect to the location of the listener relative to the four loudspeakers 190–193, good results are achieved with the listener's head positioned as indicated, i.e., facing in a direction between any pair of speakers rather than facing any one of the speakers. However, the novel musical effects according to the present invention can be also achieved with some latitude in terms of the position of the listener's head relative to the speakers.

Modified baffle and microphone arrangement

Referring now to FIG. 14, there is shown an alternate form of microphone mounting which is adapted to position a plurality of microphones to be used in the so-called spaced microphone recording or broadcasting technique. FIG. 14 shows a plurality of microphones, M–1, M–2, etc., . . . M–8 equally spaced about the padded exterior cylindrical surface of a baffle assembly 195. The entire assembly 195 includes a hollow core 48a corresponding in size and shape to the core 48 of the baffle and microphone support assembly shown in FIG. 5. In the preferred form of the invention, the entire baffle 195 may be positioned on the shaft which supports the form of baffle shown in FIGS. 2 and 5 from which it may be removed by removal of fastener 196. In other words, the two different forms of baffles may be interchangeably used, depending on the desires of the conductor or recording engineer.

One principal respect in which the baffle of FIG. 14 differs from the baffle of FIGS. 2 and 5 is that the microphones are connected in a different manner to the recording facility with which they are associated, so that, upon playing music recorded with a baffle of this type, the microphones are differently associated with the speakers through which the the music is played. For example, referring again to FIG. 14, a channel would typically comprise the entire output of microphone M–1, and one-half of the output of microphone M–8 and one-half of the output of microphone M–2. A second channel would comprise the entire output of microphone M–3 a well as half the output respective of microphones M–2 and M–4, and so on around the baffle. In other words, each channel would be associated with one principal microphone having on opposite sides thereof a pair of individual microphones, each equally spaced from the principal microphone, and each contributing one-half of its output to the principal microphone in question. Thus, moving about the periphery of the baffle, alternate microphones spaced therebetween contribute one-half of their output each to the principal microphones flanking them.

Referring now to the physical construction of the baffle 195, a layer of sound absorbing material surrounds four spaced apart electronic sound absorbers 198, each of which has a vertically spaced apart counterpart (not shown) on the upper half of the baffle, in much the same way that their conterparts 52a are diposed in the baffle shown in FIG. 4. Lying inwardly of the sound absorbing material 197 are a plurality of vertically extending, spaced apart battens 199 supported on a cylindrical steel core 200. A plurality of air spaces or chambers 201 are defined by adjacent pairs of battens 199, the inner surface of the sound absorbing material 197, and the radially outer surface of the cylinder 200.

The function of these units in this embodiment is the same as the function of their counterpart in the other baffle structure, namely, to absorb or suppress sound so that it will not be picked up by a microphone which is not intended to receive these sounds. The other operational characteristics of microphones of this type are well known to those skilled in the art. Although, in keeping with the invention, it is not strictly necessary that this baffle 195 be arranged so that it may be interchanged with the other baffle, an advantage of the invention is that additional versatility may be obtained in this way. Another advantage of being able to use either type of baffle, is that, if desired, a recording can be made having a number of constituents recordings, one or more of which may be made with the use of one form of baffle, and one or more of which may be made using the other form of baffle. In other words, the composite recording may be made by the spaced microphone technique as well as by intensity stereophony techniques.

It is also preferred that a dummy head (not shown) of the type shown in 110 in FIG. 4 be provided for use in association with the baffle of FIG. 14, and that this head would be suspended therebeneath and would be electrically connected in the same manner as its counterpart. It is also within the scope of the present invention to associate different types of microphones and different forms of microphone connections with different baffle forms, including the forms specifically disclosed herein. For example, using a baffle as that shown in FIG. 4, an inline microphone type arrangement might be made for the purpose of extending the effective pickup range of the microphones. Likewise, other known variations in microphone disposition and arrangement may be made for use with baffles such as those illustrated herein. As pointed out above both of the baffle and microphone arrangements are useful to produce novel musical effects, including the advantage brought about by the movement in space of a microphone associated with the particular speaker in proximity with a number of different, spaced apart sound sources. As a result, sound emitting from one speaker has been picked up from a number of different points in space.

To a certain extent, a counterpart of this effect may be brought about by an arrangement which includes provision for switching the output of a channel associated with a particular microphone between any one or more of a number of individual speakers in a plural array of speakers, such as by electronic switching or the like. For example, such a system may utilize infrasonic signals on the audio tape or recording which, when picked up, would transfer the output to another speaker in the same array of speakers. The result of this technique would be the operative association of different speakers with different microphones, bringing about an illusion of a nature somewhat similar to that brought about by the use of the technique and apparatus of the invention described in more detail above.

In the preferred form of pacing system, which was described in detail above, the feedrate or rate at which the baffle movement takes place is controlled in relation to the rate at which the musicians are playing the composition by a feedback arrangement wherein the feedrate is continually adapted to be governed by the differences between the metronomic tempo and the tempo at which the composition is being played. However, although not preferred, it is contemplated that the present invention could be carried out in a manner such that the numerical control system, and particularly the control of feedrate, would not be paced or governed by the rate at which the composition is played, but would only be shut off or rendered inoperative in the event that a preset, desired tempo were not maintained. This would typically be carried out by means of a system of timers and relays which, if not activated by preselected pacing tones within the musical score in the desired sequence, would operate to disconnect or shut off the system.

One important feature of the invention is that the illusion that music or other sounds being picked up are emanating from virtual sources is brought about by precise control of the movement of the pickup means as well as the control of certain operational parameters associated therewith.

A somewhat similar, though different and incomplete effect is sometimes attempted to be brought about by altering the volume or distribution controls associated with playback or pickup means reproducing sounds or music which has been recorded by different techniques. For example, it is known to use a panning potentiometer or panning mixer for such purpose. In this case, for example, two speakers are each fed with a common sound or series of sounds, and, by volume control of the signal fed to the speakers, the sound may be made to appear to move from one speaker to the other, or to be controllably positioned anywhere therebetween. Although the present invention can also be used in a manner such that effects of this type are able to be brought about thereby, the prior art method just described is of severely limited utility, particularly in respect to the variety of effects which can be brought about by the present invention. Nevertheless, it is within the ambit of the present invention to use control systems of the type described herein to manipulate plural potentiometers, mixers, or other volume or input signal control devices so as to bring about musical effects of this general type. Furthermore, the invention particularly comprehends the use of controls of this sort when they are programmed according to the method of the present invention, and especially when paced or rated in accordance with the tempo of a composition being executed or played back and picked up by equipment of the type described herein. Accordingly, it will be seen that although such techniques do not have all the characteristics and advantages of the invention, the unique programming and control of prior art recording or broadcasting techniques by means of the type described herein may form a part of the present invention.

In this connection, it will be realized that it is within the scope of the invention to substitute for any sound source of a type coming from a live musician or performing instrument or sound source, a loud speaker or other reproducer generating sounds. However, it is clear that whatever limitations or imperfections inhere in one or more of the loud speakers, or in the combination thereof will, at least to a limited extent, characterize the end musical product or the like made by the apparatus of the invention.

As pointed out above, it is also within the scope of the invention to display the music or to display a live or recorded image of the conductor on a teleprompter or viewer so that a musician may observe the leader or the music. In such case, the feedback or advance rate of the program in the form of the musical score or the tempo of the director's motions may be varied under the control of the pacing and numerical control system.

Another variation which is contemplated in the practice of the invention is that the information input to the tape reader may be controlled by a command tape which recorded the output of the variable frequency oscillator portion or the variable voltage reference control portion of the pacing system. In other words, in the form of the invention described in detail, the speed of input to the tape reader was controlled by an adjustment system which made periodic reference to the tempo of the music being executed, so that the feedrate or rate of baffle and microphone movement could be properly controlled. It is within the scope of the invention to control the speed of the tape reader input by means of a recording which was made at the same time the pacing system detected the musicial tempo and made the desired adjustments to the reader indicated by this tempo.

In this connection, it should be kept in mind that, after one performance or "take" of the composition has been recorded, the musicians subsequently executing the same or different parts of the same composition will be listening to such earlier "take" and will therefore execute the composition at the same rate as the rate at which it was executed before. In the case of plural sources simultaneously being recorded or broadcast, the musicians are able to hear one another and therefore all performances are synchronous within the artistic limitations of the musicians. In connection with the above illustrated case of plural simultaneous musical pickup, it will be appreciated that since the musicians will all be performing the composition at the same instantaneous tempo, the baffles will need only one pacing system among them and therefore the output of this pacing system may be delivered to a single information reader or plural readers may be synchronized with one another with only one being required to be controlled by a pacing system. In the case of plural successive takes, the movements of the single baffle are paced once, and thereafter, baffle movement during subsequent takes is made to depend on the input rate to the reader which was established by the pacing system during the first "take."

As will be apparent to one skilled in the art, the detailed description herein did not extend to a specific description to each element of a sound system or control system, such as the amplifiers which would be necessary to bring about control of physical movement or acoustical parameters of the invention, or to other elements of the apparatus required in the interest of recording fidelity, such as cable shields, matching transformers, filters, etc. The use of such elements is conventional and well known to those skilled in high fidelity recording and broadcasting techniques. Included within such elements are, for example, the use of or substitution of conductors adapted to permit relatively extended rotational movement between electrically coupled parts to eliminate the need for slip rings, brushes, and other elements likely to induce static which, although able to be subsequently eliminated, is a drawback in a high quality audio system. Similarly, no description was made of well known means provided for eliminating undesired non-linear amplification of certain frequencies which characterizes recordings or broadcasts utilizing echo chamber or reverberation techniques. Another example of a substitution which may be made in keeping with the invention is the replacement of the individual tone detectors forming a part of the tone detector bank 137 with a continuously tunable electronic filter. In using such a filter of the band pass type, for example, the unit might periodically be turned on and adjusted to a desired response frequency just prior to the expected time at which such frequency would occur in the playing of the composition.

Typically a compressor would precede, and a metering relay would succeed, such filter, in the filter circuit in the desired embodiment.

A continuously operating timing motor was used for movement of the variable frequency oscillator control knob in the above-described preferred embodiment. A pulsed timer or other known equivalent might be substituted for such a timing motor, for example. A number of other various forms of controlling tape reader input speed in relation to the length of a plurality of successively detected time lapses are known to those skilled in the art, and may be substituted herein.

There are a number of other, though less generally convenient methods of detecting baffle position for the feedack necessary to positional movement thereof in the desired sequence and at the desired rate, such as triangulating detectors, etc., but description thereof is not believed necessary to an understanding of the invention.

Referring now to another novel effect which may be achieved with the apparatus of the invention, namely, the apparent disposition of a virtual sound source between any one or more of the remotely positioned loudspeakers forming the speaker array surrounding the listener and the listener himself, this effect is best achieved by placing one or more speakers relatively nearer the listener, and playing through this speaker some or all of the same music or the like which is being played through the closer speaker so that sound emanating therefrom falls on the ears of the listener at the same time sound from the more remote speakers falls on the listener's ears. For this effect to be most satisfactory and credible, it is necessary to have the time delay to the nearer speaker precisely controlled, and also to have the volume controlled so that the listener will detect no discernible difference in volume of the portions of the composition common to both sound sources. In this way, the illusion of one common source disposed between the two actual sources will obtain, rather than the effect of two discrete sources. Such an effect is advantageously brought about by an apparatus which will now be described in illustrative form.

Referring now to FIGS. 16–18, such an apparatus is shown to include a control system 300 for continuous adjustment of a pair of ganged potentiometers 301, 302 or attenuators adapted to control the volume output of the eight microphones 56, 56' . . . 59, 59' shown in FIGS. 10 and 10A to be associated therewith, so that when a single composite audio channel 303 is made from all eight microphone outputs, the loudness of the output of each vertically coincident microphone pair may be properly controlled in relation to the position of the baffle with respect to the sound source associated with such vertically coincident pair when the pickup was made. This is carried out in a manner analogous to the manner in which microphone declination was brought about, and therefore this portion of the apparatus is arranged so that correct compensation is brought about, even taking into account the fact of baffle rotation, as will now be set forth.

Referring now in particular to FIG. 16, there are shown two cross arms 75, 85, which are preferably the same cross arms referred to in connection with a description of FIG. 7. Accordingly, it will be appreciated that the wheels 76 and 84 are alternately receiving a position indicating signal from associated synchrotransmitters 145, 153 as they pass successively through consecutively 90° quadrants. In other words, during one complete rotation of the baffle and microphone assembly "A," wheel 84 receives a signal of characteristic magnitude from transmitter 145, 90° later it receives its signal from transmitter 153, then from transmitter 145 of reverse polarity to that previous quadrant for the next 90° rotation, and finally receives a signal once again from transmitter 153, of reverse polarity to that just previous thereto. The same situation prevails in respect to the wheel 76, except that, in reference to one starting position, the transmitters each feed different wheels. In addition, for some time during rotation, which time may be varied in the same way as variation thereof may be carried out in respect to declination of vertically coincident microphone pairs, the wheels may share the output of both transmitters, thereby averaging their output during this transition period. This action of correct association regardless of baffle position, is carried out by reason of the alternately reversible electrical connections, such as connections 100 to 105 and 101 to 104 between the synchro transmitters 145, 153 and the TORQSUNS 78, 82 which drive the wheels 76, 84 in the desired relation regardless of baffle position.

As a result of these connections, and the provision of the potentiometers 301, 302, microphone output will be proportional to the instantaneous position of the microphone in relation to the sound source when the broadcast or recording was made. In this connection, it will be appreciated that ganging the pairs of potentiometers 301 and 302 brings about the effect that single-direction rotation will simultaneously strengthen the output of one microphone and diminish that of the oppositely directed microphone. Using this recording technique, a fifth channel is produced for reproduction over the time delayed, volume controlled binaural set 306, and the effect will be that of the movable virtual sources described below. Such recording or broadcasting technique is equally satisfactory whether accomplished with the intensity stereophony pickup technique or with the spaced microphone technique.

Referring now in particular to FIG. 17, there is shown a binaural speaker system 306 incorporated into a headrest 307, and fed from a continuously variable audio time delay line 308 placed in the composite audio line 303, schematically shown in FIG. 16 as receiving an input from all eight microphones. In the use of the system, various virtual sources S may be made to appear in the hearing of the listener by appropriate volume control and time delay in line 303, such as by delay line 308 and volume control 309, as pointed out above. In this illustration, the speakers may be the same as speakers 190–193 of FIG. 10A, and lines 186–189 respectively feed them from an appropriate source, such as a five-channel tape recorder 185. In this form of the invention, the virtual sources S appear to move about as shown by the dotted line arrows as a result of baffle positioning during pickup for broadcasting or recording. Thus, with a proper setting of this form of apparatus, a given virtual source will appear to move about in the same manner as if it were a fixed radial extension of the baffle itself. Such effects are particularly useful in theatre work and for other dramatic effects.

It will be appreciated by those skilled in the audio reproduction art, that the fifth channel referred to above may be created, instead of by an individual recording made using the control device of FIG. 16, by producing a single composite phantom channel upon playback, such channel being merely derived from existing, prerecorded channels as opposed to having been recorded or broadcast by itself. In such a case, however, the volume of the phantom channel is overly dependent on microphone positioning, and accordingly, upon playback, the phantom channel undergoes excessive volume gain and takes undue amplitude or volume precedence in the perception of the listener. As a result virtual source movement is undesirably sudden and tends to be located too near the listener too often. Although the use of a phantom channel for the purposes under consideration is accordingly not as advantageous as the use of a fifth channel picked up as set forth below, compensation for this effect can be brought about by the provision of an automatic volume control within the binaural speaker set, or by other known means, such as negative electrical feedback or mechanical volume control during playback. Accordingly, particularly if properly compensated for, the use of such a phantom channel is considered to be within the scope of the present invention.

Referring now in particular to FIG. 18, there is shown a preferred form of binaural set 306 in the form of a headrest 320 having a body portion 322, a right hand speaker 324 and a left hand speaker 326, each disposed with a reference line perpendicular to its diaphragm directed generally upwardly and inwardly. Lines 328, 330 respectively connect the speakers to an adjustable delay line unit 308, from which a common line 332 extends to the volume control 309, which is in turn placed in the composite audio line 303. A headrest 334 is disposed centrally of and surmounting the body 322 in order to support and aid in positioning the head of the listener. As will be appreciated, control of time delay and volume are not necessary except to obtain an initially proper setting based on remote speaker location and on the location of the binaural set 306. The controls in the embodiment are shown to be mounted on a base 336 which is spaced apart by leg 338 from the body 322 of the set 306.

This form of headrest is also suitable for use as a separate unit for use with ordinary radio receivers, television receivers, and phonographs, etc.

The foregoing system presumes the use of compressor/limitors succeeding the potentiometers for changes in program loudness. With amplifiers of substantially similar frequency-gain characteristics in their lower and higher ranges, it may be necessary for the ganged potentiometers to be used for changing the output of channel 303 inversely proportionally to the distance between the source and the microphones.

As brought out before, the baffle as a whole in either the spaced microphone technique form thereof or in the intensity stereophony form, may be translated as a whole parallel to either the x- or y-axes, and further may be translated in the plane defined by these axes in any desired pattern. As a result, the baffle may be made to approach or depart from a given position within the studio. Furthermore, it was pointed out that the baffle itself is capable of rotating at varying speeds in either rotational direction, i.e., clockwise or counterclockwise. The above description also brought out that when intensity stereophony is used, a given vertically spaced apart microphone pair may have the individual microphones thereof physically rotated with respect to the common vertical axis of rotation extending therethrough, to bring about declination of the diaphragms of the microphones. In addition, the polar response pattern or effective pickup areas of various microphones may be altered by movement of controls associated with such microphones. Furthermore, reverberation control may be effected by the means described above in detail, or by their equivalents. In addition to being independently variable, at least from a theoretical standpoint, at least some of these controls may also be made to follow the function or position of another variable in a preset, dependent relation. As an example, microphone deflection was illustrated as being controlled so that the diaphragms were inherently moved to certain positions, depending upon the position of the baffle itself from a translational standpoint, as well as in regard to its instantaneous rotational position. The effect able to be brought about by microphone movement of the kinds able to be produced according to the invention, includes the effects able to be achieved by successive recording or simultaneous plural sound source pickup for broadcasting, namely, repeating "takes" of the same or related music so as to provide a multichannel recording or broadcasting. As will be brought out, microphone positioning during subsequent recording "takes" may bear any desired closely controlled relation to the microphone movements carried out in making another or earlier pickup or recording.

Referring now to one effect which can be achieved by the present invention, with the sources of sound comprising an array or group of musicians disposed in a ring or circle with the baffle positioned so as to locate the microphones in the middle thereof, rotating the baffle and microphone assembly produces the effect that the musicians are moving as a group about the listener. The impression is also present that the musicians are maintaining fixed positions relative to each other while they are rotating as a group. This effect is brought out by simple baffle rotation, without translation thereof. The apparent speed of motion of the sound sources or musicians depends on the rotational speed of the baffle. Accordingly, in a successive recording "takes" wherein the baffle is moved as described above during one take, but is moved in an opposite direction in a subsequent take, the resulting impression is that of plural groups of musicians moving in opposite directions relative to each other.

If this technique is carried out under conditions such that the rate of baffle rotation differs in various takes, an effect of different movement rates will be created, with the further effect that coincidence of virtual sources will occur at one or more moving virtual points. The novel musical effect of ready musical identification of a particular part or voice may be created by arranging for an apparent sound source movement peculiar to that sound source or musical factor by reason of baffle movement in a given relation to such voices or parts of the score, particularly during different successive "takes." For example, in a composition such as fugue, each different musical part may be identified not only by its unique melodic or rhythmic identity, but also by its apparent relative spatial motion caused by spatial baffle movement during recording.

In the cases considered above, it will be appreciated that, since the listener has the impression that he is disposed in the center of a group of musicians, a recording sensation which has not, it is believed, been utilized before, and since the impression can be created that the musicians as a group are circling the listener, it also follows that the listener may obtain the impression that the musicians are relatively fixed and that he himself is undergoing rotation. As a consequence, if baffle movement occurs at varying rates, the impression of changing movement rate is created. If this impression is created periodically in a fixed rhythm, particularly a rhythm forming a part of or complementary to the rhythm of the musical composition, the basic or imposed rhythm may be intensified or underscored in the impression of the listener. As a result, it may be seen that grotesque or comic perceptual effects may be brought about by a deliberately irregular baffle rotation or rotation of an incongruous tempo or rhythm in relation to that of the composition as executed. It is also possible, by use of an apparatus made according to the invention, because of the selective hearing or attention capacity, faculty, or power of the listener, and because of the auditory pursuit tracking inherent in the listener's perception, to bring about apparent harmonic progressions which are caused solely by spatial factors: namely, the actual or apparent physical spacing apart of the musicians may be created, underscored, or reinforced by baffle movement.

The need for the precision control and for the capability of rapid as well as varied microphone movement to bring about these effects makes it clear that the provision of the numerical control system described above is a great advantage in an apparatus made according to the invention. Since, as pointed out above, the timing of baffle movement is an important part of the musical effect created, the need for an accurate pacing system is also apparent, that is, the baffle will not only be able to move in the desired complex motional sequence, but the sequence will be carried out in the desired relation to the tempo of the music as it is actually being played, regardless of whether this tempo coincides with that indicated on the musical scoring. In the use of the apparatus, the effect of musical counterpoint may be brought about by the use of the baffle itself without movement, by reason of the physical separation of plural sound sources, and such counterpoint may also be additionally brought about or emphasized by baffle movement, as pointed out above. Since this apparent property may be imparted to the music, in the impression of the listener, by reason of baffle movement and since the listener possesses the capacity for selective hearing and auditory pursuit tracking, a novel form of apparent counterpoint may be imparted to a musical composition although the originally written plurality of melodies or rhythms would not in themselves create this effect, or create it to the degree with which it may be brought out in the perception of the listener using the apparatus of the invention. Upon successive takes, baffle movement can be used to bring about or emphasize harmonic and temporal rhythms; and as a result this causes the individual rhythm to concide, dovetail, or contrast with each other. In this connection it will be understood that baffle rotation during a given take might be a rhythmic back and forth or periodically reversing rotation rather than gradual or continuous unidirectional rotation. Baffle position in relation to the musicians to bring about a given effect may also be taken into account by a composer wishing to achieve a particular effect of rhythm brought about by successive notes or groups of notes being reiterated from a common location with respect to the baffle, so that the apparent positions of the musicians playing these notes appear to remain the same from a spatial standpoint.

In addition to the sense of expectation or suspense existing in a listener because of his innate expectation or musical knowledge that certain melodic or rhythmic expressions will be immediately forthcoming in a particular sequence during the playing of a score, an additional sense of suspense or anticipation for purposes of bringing about a desired emotional response may be caused to occur by a rhythmic movement of the baffle. Thus, a novel sense of expectation may result from perception of rhythmic, harmonic, or temporal factors created by baffle movement.

In addition to the effects achieved by baffle rotation, or rotation in combination with translatory movement, the invention comprehends additional effects being brought about by declinating the microphone pairs and thus changing the angle subtended between reference lines to the microphone diaphragms. As pointed out, a microphone may be thus adjusted to create the impression that a source is more concentrated in space than is actually the case, and vice versa, and therefore, changing this microphone diaphragm angle by declination of the microphone pairs may be used so as to offset the apparent change in size of the virtual source that arises when the baffle approaches such source. In addition, a source which is made to appear more concentrated in this manner is able to be more easily identified or separated from plural sources by the selective hearing faculty of the listener.

The apparent size of the musical source may also be affected by a change in the directionality or polar response pattern of the microphones. Thus, a particular source may be made to appear to occupy a narrow sector of the area biased by the selective hearing of the listener, or may be made to appear to occupy a wide sector, creating the effect of a diffuse source. Therefore, changing the polar response control helps create a lifelike effect for a listener who is normally, in life, surrounded by musical or noise effects and discriminates among them by exercise of his selective hearing faculty.

The reverberation control provided may be utilized to bring out an effect of change in apparent distance between the musical sources and the baffle. Thus, for example, an increased reverberation time creates in the listener an effect that the source is remote from him. Accordingly, gradually increasing reverberation time makes the listener believe the source is gradually moving away from him. Because this control is provided for each microphone, the effect of apparently moving all of the musicians away from a centrally disposed listener may be brought about, or individual sources or sectors may be selectively made to appear to move closer or farther from the listener. Thus, the apparent size of the circle in the center of which the microphones are disposed may be made to appear to the listener to expand or contract.

As pointed out the invention is directed to a sound system in which a number of microphones are arranged in different ways and in which the sound which is picked up may be different portions or elements of a larger composite sound or the like. Therefore, as used herein, and in the appended claims, the expression "different portions of a sound" or the like are intended to refer to situations in which the total sound picked up for purposes of recording or broadcasting may comprise, for example, first and second portions, with one sound portion being generated either by a first group of musicians who are physically spaced apart from a second group of musicians playing simultaneously to generate the other sound portion, or by a single group of musicians successively in time playing the same or another composition, with the first rendition comprising one portion and the subsequent rendition the other portion. Although the numbers illustrated are two groups and two sequences, it will be understood that any plural number of groups and/or sequences might be used. In the one case, plural microphones forming a plurality of sets may be moved in a desired sequence, with both sets being manipulated at the same time, one in relation to each musical group, whereas, in the other case, only a single microphone set might be provided which would undergo a desired movement sequence during rendition of one portion of the music by the group, and the same set of microphones would be subsequently manipulated in relation to the position of the same group of musicians playing the same or different compositions at a different time.

So considered, each portion of sound may be said to contain sound elements or elements of sound; thus a portion of sound may be a few measures of a composite musical sound emanating from a number of musicians, whereas this portion of sound may be subdivided for purposes of recording or broadcasting in auditory perspective into various elements, each of which is picked up by a microphone or microphone pair which is associated with it at least for a time. Using this example, with a baffle and microphone support assembly of the type described, a given vertically coincident microphone pair will, as the baffle rotates, encompass different sound elements consecutively within its subtended sector, that is, it may sweep past various instrumental sections comprising such elements upon baffle rotation. The common channel pair of microphones, that is, one microphone each from two adjacent vertically coincident pairs, will, between them, pick up common sound elements from time to time, since common channel pairs, by definition, face the same or practically the same direction, but the individual microphones of this pair are separated by a baffle wall for preserving the intensity of stereophony effect.

The situation is similar in the use of the spaced microphone technique; however, in this case, there is no baffle wall separating individual microphones in a common channel pair. In this technique, a common channel group is not a pair and comprises three microphone outputs, one full output and two fractional outputs. In such case, the elements of sound are considered for the present purpose to be separated by lying in the different sectors subtended by the directional axes of the principal microphones within each common channel group. Thus, the element is the sound picked up by a given sound pickup group associated with a broadcasting or recording channel as opposed to any particular element of musicians who would normally remain fixed in space as recording or broadcasting progresses.

It will thus be seen that the present invention provides a novel sound system having a number of advantages and characteristics including those hereinbefore pointed out and inherent in the invention.

I claim:

1. A sound system including a plurality of separate means for picking up different portions of generated sound coming from at least one sound source, means mounting each of said separate pickup means for movement in relation to the sound source, means for moving one of said plural pickup means during sound pickup through a desired sequence of positions in relation to said sound source to receive one given portion of the sound coming from said source, another of said separate pickup means being adapted to receive another portion of said sound, and means for moving each of the other pickup means in a desired positional relation to the sound source to pick up other portions of said sound, all of said means for moving said pickup means in relation to said source being operatively associated with and under the control of means readably indicating a desired movement sequence to be undergone by the pickup means during the time said portion of said sound is being picked up.

2. A sound system as defined in claim 1 which further includes means for controlling the rate of movement through said sequence of said pickup means receiving said first portion of said sound in relation to a characteristic tempo of said sound.

3. A sound system as defined in claim 1 in which said means operatively associated with and able to control movement of said pickup means receiving said one portion of sound is able to be associated with and control said means adapted to pick up another portion of said sound.

4. A sound system as defined in claim 1 in which said means for moving said pickup means includes means for moving said pickup means at a different time in said desired relation to movement previously undergone by said pickup means.

5. A sound system as defined in claim 1 in which said means indicating said desired movement sequence is a preselected positioned sequence program in the form of an information storage medium, and in which said means for moving said pickup means includes motive means responsive to a signal generated by actual position indicating means associated wtih said pickup means.

6. A sound system having a plurality of individual groups of microphones arranged for stereophonic pickup of different individual portions of composite generated sounds coming from at least one sound source, means mounting each of said individual stereophonic groups for movement in relation to said sound source, means for moving one of said plural stereophonic groups during sound pickup through a desired sequence of positions in relation to said sound source to receive one individual portion of said composite sound coming from said source, in a sequence dictated by the motion sequence undergone by said one stereophonic group, other of said individual sterophonic groups being adapted to receive other individual portions of said composite sound, and means for moving each of said stereophonic groups through a desired sequence of positions to pick up other individual portions of said sound whereby, upon composite reproduction of the sound through reproducers disposed about a listener, said individual portions of said reproduced sound will be characterized by an apparent individual movement indicative of said movement sequence undergone by said individual stereophonic microphone groups.

7. A system as defined in claim 6 wherein said stereophonic groups comprise pairs of individual microphones arranged for auditory perspective pickup by the intensity stereophony technique.

8. A system as defined in claim 6 wherein said stereophonic groups comprise pairs of individual microphones, and wherein, for each pair of microphones, one given microphone is arranged with one given microphone from an adjacent pair of microphones to form a common audio channel pair comprised of said given microphones.

9. A sound system as defined in claim 6 in which said means for moving said pickup means includes means for changing directional orientation of said individual groups of microphones in relation to said sound source.

10. A sound system as defined in claim 6 in which means for moving said microphones is able to move said microphones within a generally horizontal plane, to position said microphones in more closely as well as farther spaced apart positions relative to a given portion of said sound source.

11. A sound system as defined in claim 6 wherein said sound source comprises at least two sound sources physically spaced apart, and wherein said system has separate, plural groups of microphones operatively associated with each of said sound sources.

12. A sound system as defined in claim 6 in which each of said stereophonic groups is adapted to pick up portions of sound generated in a given location lying primarily only in a generally facing relation to said groups and which includes means for preventing substantial sound incidence on said pickup units from locations other than said locations facing said pickup units, and means for connecting the outputs of said pickup units to sound reproducers for auditory perspective reception by an eventual listener positioned generally centrally of said reproducers but independently of the rotational orientation of the head of said listener in relation to said reproducers while said listener is so positioned.

13. A sound system as defined in claim 12 in which each of said groups includes a single center microphone and a pair of flanking microphones, spaced apart about the periphery of said mounting means, and being arranged for connection to reproducing means to produce the effect of auditory perspective by the spaced microphone technique.

14. A sound system as defined in claim 12 in which said groups comprise plural pairs of microphones arranged for pickup in auditory perspective by the intensity stereophony technique.

15. A sound system as defined in claim 12 which further includes a dummy head associated therewith, said dummy head having microphone means associated therewith for binaural pickup of sounds to be reproduced by a sound system.

16. A sound system as defined in claim 12 in which said groups are mounted on a baffle having a plurality of radially outwardly extending walls joined at their inner margins to at least partially define a plurality of reentrants, said pickup groups being in the form of microphone pairs arranged for intensity stereophony sound pickup and disposed within said re-entrants.

17. A sound system as defined in claim 12 in which said pickup groups are in the form of plural microphone pairs, each microphone in each pair being mounted for rotation about a generally vertical axis.

18. A sound receiving apparatus having means thereon for mounting plural groups of stereophonic sound pickup units, each group being adapted to pick up portions of sound generated in a given location lying primarily only in a generally facing relation to said groups, means for preventing substantial sound incidence on said groups from locations other than said locations facing said groups, and means for individually connecting the outputs of said pickup units within said groups to a plurality of individual sound reproducers for auditory perspective reception by an eventual listener positioned generally centrally of said reproducers but independently of the rotational orientation of the head of said listener in relation to said reproducers while said listener is so positioned.

19. An apparatus as defined in claim 18 in which said groups comprise a plurality of individual, generally radially outwardly facing microphones each spaced apart about the periphery of said mounting means, and being arranged for connection to reproducing means to produce the effect of auditory perspective by the spaced microphone technique.

20. An apparatus as defined in claim 18 in which said groups comprise plural pairs of microphones arranged for pickup in auditory perspective by the intensity stereophony technique.

21. An apparatus as defined in claim 18 which further includes a dummy head associated therewith, said dummy head having microphone means associated therewith for binaural pickup of sounds to be reproduced by a sound system.

22. An apparatus as defined in claim 18 in which said mounting means is in the form of a baffle unit having a plurality of radially outwardly extending walls joined at their inner margins to at least partially define a plurality of re-entrants, said groups being in the form of microphone pairs arranged for intensity stereophony sound pickup and disposed within said re-entrants.

23. An apparatus as defined in claim 18 in which said groups are in the form of plural microphone pairs, each microphone in each pair being mounted for rotation about a generally vertical axis.

24. An apparatus as defined in claim 23 in which each of said individual microphones in each pair is mounted for simultaneous but opposite directional rotation with the other microphone in such pair.

25. An apparatus as defined in claim 23 in which said microphone pairs are mounted for movement such that a rotation of the individual microphones in one pair in characteristic respective directions will bring about opposite directional rotation in the counterpart microphones in the other pair.

26. The method of picking up sound in auditory perspective, including the steps of arranging a plurality of individual groups of microphones arranged for stereophonic sound pickup so at least some of said microphones lie in a generally radially outwardly facing relation to a given central point so as to collectively pick up in auditory perspective plural elements of sound coming from and directionally aligned with predetermined spatial portions of sound surrounding said central point, and retaining the identity of each sound element as said element is picked up as a recoverable audio channel, whereby said sound may be reproduced substantially unchanged with regard to the manner in which it was picked up, and whereby, with each audio channel emanating from a separate loudspeaker and with each loudspeaker operatively associated with one of said microphone groups, a listener may be given the illusion that said elements have the spatial relationship to said listener that said elements had to said pickup means during the time said sound was picked up.

27. The method as defined in claim 26 in which arranging said microphones comprises arranging plural microphone pairs in a vertically coincident axial relation to form vertically coincident pairs with the pickup axes thereof having a substantial included angle therebetween and connecting the individual microphones within each pair such that given individual microphones within each pair form common audio channel pairs with individual microphones within other vertically coincident pairs.

28. The method as defined in claim 26 in which arranging said microphones comprising spacing plural microphones apart from each other about the periphery of a sound absorbing baffle with their respective directional axes facing generally radially outwardly from said baffle, and forming said audio channels so as to include the entire output of several principal microphones and portions of the outputs of those microphones lying immediately to either side of each of said principal microphones.

29. A method as defined in claim 26 in which said individual groups of microphones, as a group, are moved about in space through a movement sequence in relation to the sound which is being picked up.

30. A method as defined in claim 26 in which said microphone groups are moved about in space in a given movement sequence in relation to the sound which is picked up to pick up a portion of the sound generated by said sound source, and in which said microphone groups are subsequently moved about in space in another movement sequence in relation to said sound to pick up another portion of said sound, and in which the sound thus picked up is reproduced as plural audio channels, at least a plurality of said channels being comprised of elements of sound from said one sound portion reproduced simultaneously with elements of sound from another portion of said sound.

31. A method as defined in claim 27 in which said vertically coincident pairs are acoustically separated from each other by sound baffling means.

32. A method as defined in claim 27 in which said vertically coincident pairs are declinated about their common vertical axis during said pickup in a predetermined relation to said movement sequence of said pickup means.

33. A method as defined in claim 29 in which said movement sequences are arranged to bear a predetermined relation to each other and to the sound source.

34. A method as defined in claim 29 in which said movement sequences have the tempi thereof regulated according to the tempo associated with the sound being picked up.

35. A method as defined in claim 30 in which said portions are recorded for subsequent reproduction, and in which one portion is recorded first and the other portion subsequently, said elements of said one portion being dubbed over elements of said other portion of said sound.

36. An apparatus for generating an apparent sound source between at least two sound reproducers, comprising, in combination, first and second sound reproducing means, means for controlling sound caused to be generated in said reproducers, including means for causing a characteristic sound to emanate from said first reproducing means at a first characteristic volume, and means for causing the same characteristic sound to emanate from said second reproducing means, and means for introducing sufficient delay between the time said characteristic sound is caused to be reproduced in said first reproducing means and in the other reproducing means to cause the sound reproduced from said first reproducing means to arrive in the area of a listener situated between said reproducers in phase with the sound reproduced from said second reproducing means, said apparatus further including means for controlling the volume of said sound so that the sound reproduced from said first reproducing means arrives in the area of a listener situated between said reproducing means with equal volume with the sound reproduced from said second reproducing means.

37. An apparatus for reproducing an illusion of a virtual sound source located between a listener and a relatively remote loudspeaker, comprising in combination, a least one second loudspeaker means for operative association with said remote loudspeaker for reproducing the same sound being reproduced by said remote loudspeaker, means for controllably delaying reproduction of sound in said second loudspeaker means by a fraction of the time required for said sound to reach said second loudspeaker from said remote loudspeaker, and volume control means for said loudspeaker means, whereby said sound emanating from said remote loudspeaker and said second loudspeaker means is in phase and of equal reception volume in the area of said listener.

38. A sound system for use in recording, broadcasting and the like, comprising, in combination, means for picking up at least portions of a sound being generated, means for moving said pickup means through a sequence of positions in relation to the sources of said sound, means adapted to contain a program comprising a sequence of positions for said pickup means, drive means having a rate control associated therewith for positioning said pickup means sequentially in response to information obtained from said program containing means at a rate which varies in response to the setting of said rate control, and means for varying the setting of said rate control in response to the rate at which characteristic detectable tones occur in the sound being picked up.

39. A sound system as defined in claim 38 which said pickup means includes plural sets of microphones arranged for intensity stereophony pickup of sounds.

40. A sound system as defined in claim 38 in which said pickup means includes plural sets of microphones arranged for spaced microphone technique stereophonic sound pickup.

41. A sound system as defined in claim 38 in which said sound sources comprise an array of musicians disposed so as to form a generally open sound pickup area generally centrally of said array of musicians, and in which said pickup means is adapted to be positioned within said area for sound pickup.

42. A sound system as defined in claim 38 in which said means for moving said pickup means includes positioners responsive to a signal generated by actual position indicating means associated with said pickup means.

43. A sound system as defined in claim 38 in which said drive means includes a numerical control reader adapted to receive information from said program containing means for determining the position sequence through which said pickup means is to be moved.

44. A sound system as defined in claim 38 in which said rate control is in the form of a variable frequency oscillator in driving relation to a synchronous motor controlling the rate at which said drive means is operated, and in which the frequency of said oscillator is able to be varied by intermittent comparative association with a timing motor and positioner which are adapted to be actuated for periodic resetting by detection of said tones in said sound.

45. A sound system as defined in claim 38 in which said rate control is in the form of a variable reference voltage control in driving relation to a direct current motor controlling the rate at which said drive means is operated, and in which the voltage of said variable reference voltage control is able to be varied by intermittent comparative association with a timing motor and positioner which are adapted to be actuated for periodic resetting by detection of said tones in said sound.

References Cited

UNITED STATES PATENTS

| | | | |
|---|---|---|---|
| 2,053,833 | 9/1936 | Jones | 179—149 |
| 2,941,044 | 6/1960 | Volkmann | 179—1 G |
| 1,850,130 | 3/1932 | Gannett | 352—11 |
| 3,491,201 | 1/1970 | Tyler | 178—7.8 |
| 2,924,660 | 2/1960 | Abrams | 179—1 G |
| 2,343,471 | 3/1944 | Nixon | 179—1 G |
| 2,137,032 | 10/1938 | Snow | 179—1 G |
| 1,422,877 | 7/1922 | Maxfield | 179—1 G |
| 2,791,628 | 5/1957 | Edmondson | 179—1 G |
| 2,042,990 | 6/1936 | Hammond | 179—1 G |
| 3,236,949 | 2/1966 | Atal | 179—1 G |
| 3,360,606 | 12/1967 | Ratliff | 179—1 G |
| 3,046,337 | 7/1962 | Hornyak | 179—1 G |
| 3,110,769 | 11/1963 | Bertram | 179—1 G |

FOREIGN PATENTS

| | | | |
|---|---|---|---|
| 1,112,436 | 11/1955 | France | 352—3 |
| 211,395 | 3/1959 | Germany | 179—1 D M |

OTHER REFERENCES

Burstein: Stereo Microphone Techniques, Electronics World, March 1960, pp. 66–7, 126.

KATHLEEN H. CLAFFY, Primary Examiner

J. B. LEAHEEY, Assistant Examiner